US010261564B1

(12) United States Patent
 Gollakota

(10) Patent No.: US 10,261,564 B1
(45) Date of Patent: Apr. 16, 2019

(54) GOAL ORIENTED DEVICE CONFIGURATION

(71) Applicant: AMAZON TECHNOLOGIES, INC., Seattle, WA (US)

(72) Inventor: Sembhayya Gollakota, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/631,502

(22) Filed: Feb. 25, 2015

(51) Int. Cl.
 *G06F 1/32* (2006.01)
 *G06F 1/3212* (2019.01)
 *G06F 9/4401* (2018.01)

(52) U.S. Cl.
 CPC .......... *G06F 1/3212* (2013.01); *G06F 9/4411* (2013.01)

(58) Field of Classification Search
 CPC ......... G06F 1/32; G06F 1/3212; G06F 9/4411
 See application file for complete search history.

(56) References Cited

U.S. PATENT DOCUMENTS

| 2012/0324348 | A1* | 12/2012 | Rounthwaite | G06F 17/211 715/256 |
| 2013/0191662 | A1* | 7/2013 | Ingrassia, Jr. | G06F 1/3206 713/320 |
| 2014/0149753 | A1* | 5/2014 | Park | G06F 1/206 713/300 |
| 2014/0331125 | A1* | 11/2014 | Tigchelaar | G06F 17/211 715/249 |
| 2015/0198996 | A1* | 7/2015 | Kliegman | G06F 1/3212 713/324 |
| 2015/0293575 | A1* | 10/2015 | Hampson | G06F 1/3212 713/323 |

* cited by examiner

*Primary Examiner* — Austin Hicks
(74) *Attorney, Agent, or Firm* — Lowenstein Sandler LLP

(57) ABSTRACT

A device configuration application determines a task to be completed prior to an amount of power available from a battery being below a predetermined threshold amount of power. The device configuration application determines one or more user characteristics impacting power consumption associated with the task and current device configuration settings of the user device, and determines a current amount of power that is available from the battery based at least in part on the current device configuration settings. The device configuration application determines one or more new device configuration settings to extend an amount of time that the current amount of power allows device functionality related to the task.

19 Claims, 16 Drawing Sheets

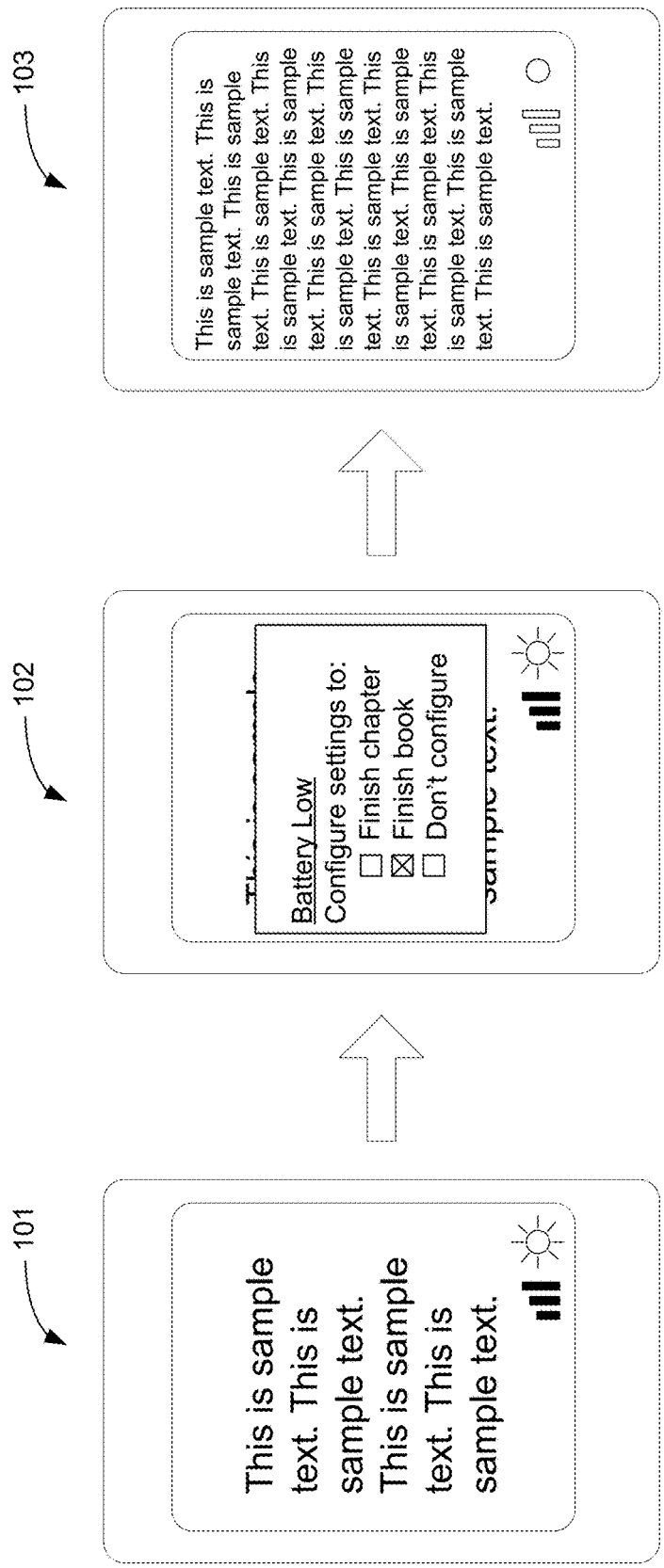

| User Profile Data 242 | |
|---|---|
| Reading speed | Words/min |
| Font size | > 8 pt. |
| Margin size | > 12 pt. |
| Front light | > 4 |

Fig. 3B

| Device Profile Data 244 | |
|---|---|
| Screen Rendering | Power/page |
| Front Light active | Power/min |
| WLAN active | Power/min |
| WAN active | Power/min |

Fig. 3C

GOAL ORIENTED DEVICE CONFIGURATION

BACKGROUND

A large and growing population of users enjoys entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

FIG. 1A is a diagram illustrating a user device utilizing goal oriented device configuration, according to an embodiment.

FIG. 3B is a diagram illustrating a user profile data structure, according to an embodiment.

FIG. 3C is a diagram illustrating a device profile data structure, according to an embodiment.

DETAILED DESCRIPTION

Figure 1B:
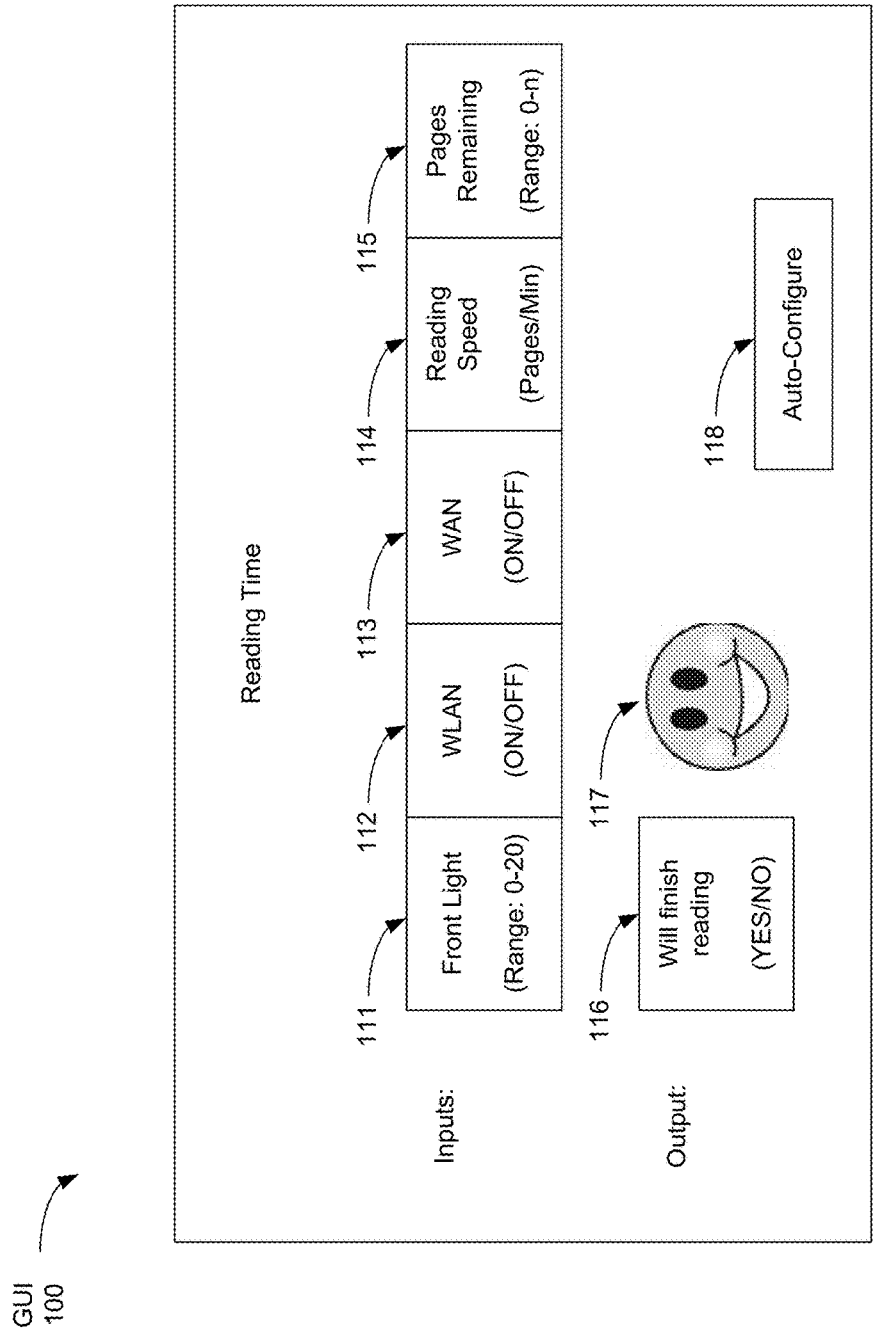
FIG. 1B is a diagram illustrating a user interface for goal oriented device configuration, according to an embodiment.

Embodiments are described for goal oriented device configuration. In certain embodiments, the device configuration settings may affect device performance, such as remaining battery life. The remaining battery life may be represented by an amount of power available from the battery in the user device. The remaining battery life may expire when the amount of power available from the battery falls below a predetermined threshold amount of power. Depending on the embodiment, this threshold amount of power may be zero or some value greater than zero. The ability to adjust these device configuration settings may increase performance (e.g., extend the battery life) while allowing a user of the device to complete a goal.

In one embodiment, a device configuration application running on the device detects an occurrence of a power condition on the user device. For example, the power condition may include a battery power level falling below a threshold. In another embodiment, the device configuration application may detect an occurrence of a time condition indicating sustained use of the user device for a period of time. In another embodiment, the device configuration application may be manually launched in response to a request from a user of the user device.

Once activated, the device configuration application can perform goal oriented device configuration operations as described below. Upon activation, the device configuration application may identify an application goal including a task to be completed prior to expiration of a remaining battery life of the user device. For example, the application goal may include completing consumption of an electronic publication, providing navigation directions to a selected location, among many other possible tasks.

In addition, the device configuration application may determine one or more user characteristics that impact power consumption associated with the task. For example, the user characteristics may include a reading speed of the user, a desired minimum font or margin size, a preferred font type, etc. The device configuration application may further determine current device configuration settings of the user device, including a display brightness level, an activation status of a wireless local area network (WLAN) receiver, an activation status of a wide area network (WAN) receiver (e.g., for a cellular data/voice/text connection), an activation status of a global positioning system (GPS) receiver, current font and margin sizes, current font type, etc. The WLAN receiver may be, for example, a WiFi™ receiver or other receiver. In one embodiment, the device configuration application calculates a remaining battery life for the user device based on the current device configuration settings. The remaining battery life may be expressed as period of time (i.e., given the current device configuration settings, the battery will be expected to last for some number of days, hours, minutes or seconds, or as a number of screen renderings (i.e., give the current device configuration settings, the battery will allow for the display/rendering of some number of pages). The device configuration application may compare the remaining battery life for the user device to an expected amount of time associated with completion of the task given the one or more user characteristics (e.g., how long it will take the user to finish reading the electronic publication at their normal reading speed) or a number of remaining pages in the electronic publication and determines whether the user will complete consumption of the electronic publication before the battery dies.

Upon determining that the remaining battery life is insufficient for the given task, the device configuration application may adjust one or more of the device configuration settings to decrease a rate at which the battery power level of the device is drained, extend an amount of time for which the current amount of power that is available from the battery in the user device allows device functionality related to the task and allow the user to reach the application goal. In one embodiment, the device configuration application automatically configures the one or more device configuration settings according to weighted user preferences in a user profile associated with the user. For example, the device configuration application may disable certain components of the user device that the user has ranked of lesser importance or decrease the font and margin sizes (thereby increasing the amount of content on each page and decreasing the number of pages remaining in the publication) in order to decrease a rate at which the battery power level of the device is drained and extend an amount of time for which the current amount of power that is available from the battery in the user device allows device functionality related to the task. In another embodiment, the device configuration application receives user input including adjustments to the one or more of the device configuration settings, and configures those settings according to the user input. For example, the user may manually disable certain components (e.g., a WLAN receiver) or decrease certain settings (e.g., display brightness level) in order to increase the expected battery life.

The goal oriented device configuration described herein may optimize a balance between active device components and battery life while allowing a user of the device to complete a goal. The device configuration is dynamic in that it can be tailored to the power requirements of a specific goal, thereby only deactivating the minimum amount of device resources. Goal oriented device configuration offers improved performance when compared to static power management configurations, which allows for an improved user experience.

FIG. 1A is a diagram illustrating a user device utilizing goal oriented device configuration, according to an embodiment. Display 101 of the user device illustrates the current device configuration settings. In one embodiment, the font and margin sizes are relatively large and certain settings such as network connectivity or display backlight may be activated. In one embodiment, in response to a triggering action such as the occurrence of a power condition on a user device (e.g., the battery reaching a certain level of charge remaining), a device configuration application on the user device can display a user interface as shown in display 102. In display 102, the user interface indicates that the battery level is low and provides one or more user-selectable options for reconfiguring the device settings. Each option may be associated with a different goal, such as allowing the user to finish reading the current chapter or allowing the user to finish reading the entire book. An option not to reconfigure any of the device settings may also be provided, although if the device settings are not adjusted, the user may not be able to achieve their goal before the battery dies. If an option to reconfigure the device settings in order to enable the user to achieve a certain goal is selected (e.g., to finish reading the entire book), the device configuration application may adjust one or more device configuration settings on the user device to allow the user to achieve the selected goal given the remaining battery life. In one embodiment, as shown in display 103, the device configuration application may decrease the font size, reduce the size of the margins on each page, and disable certain components, such as network connectivity and the display backlight. Adjusting the font and margin sizes may increasing the amount of content on each page, thereby decreasing the number of pages remaining in the book that must be displayed. Disabling the network connectivity and display backlight may decrease a rate at which the battery power level of the device is drained and extend an amount of time for which the current amount of power that is available from the battery in the user device allows device functionality related to the task. These adjustments may allow the user to achieve the selected goal of finishing the entire book before the battery dies in the user device.

FIG. 1B is a diagram illustrating a user interface 100 for goal oriented device configuration, according to an embodiment. In one embodiment, in response to a triggering action such as the occurrence of a power condition on a user device, a time condition on the user device, or a manual user request, a device configuration application on the user device can display user interface 100. In one embodiment, user interface 100 may be a graphical user interface (GUI). User interface 100 may include a number of inputs 111-115 and one or more outputs 116-117 related to goal oriented device configuration. In one embodiment, the inputs include a display brightness level (i.e., front light) 111, a status of a WLAN receiver 112, a status of a WAN receiver 113, a user reading speed 114 and a number of pages remaining in an electronic publication 115. In one embodiment, the outputs include a textual indication 116 of whether the user will complete reading the number of pages remaining 115 before the battery dies, and optionally a graphical indication 117 of the same. In other embodiments, GUI 100 may include different or additional inputs and outputs.

In one embodiment, the values associated with inputs 111-115 are manually input into GUI 100 by a user of the user device. For example, a user may input a value (e.g., in a range from 0-20) indicating the screen brightness level 111, a value (e.g., ON or OFF) indicating whether the WLAN receiver 112 and WAN receiver 113 are currently activated, a value (e.g., expressed in pages per minute) indicating the user's typical or expected reading speed 114, and a value (e.g., in a range from 0-n) indicating how many pages are remaining 115 in the electronic publication that the user wished to complete before the battery dies. In another embodiment, the values associated with inputs 111-115 are populated automatically by the device configuration application. For example, the device configuration application may query a device configuration controller on the user device to determine the current screen brightness level 111 and statuses of the WLAN 112 and WAN 113 receivers. The device configuration application may additionally track user interactions with the user device including past reading speeds and determine an estimated reading speed 114 for the current electronic publication. In addition, the device configuration application may query an electronic reading application on the user device to determine a number of pages remaining 115 in the current electronic publication.

In one embodiment, the device configuration application determines the values associated with outputs 116-117 and displays them in GUI 100. For example, the textual indication 116 of whether the user will complete reading the number of pages remaining 115 before the battery dies (e.g., YES or NO), and the graphical indication 117 of the same (e.g., a smiley face corresponding to YES and a sad face corresponding to NO) may be calculated based on a remaining battery life of the device given inputs 111-113 and an expected amount of time it will take the user to finish reading the electronic publication given inputs 114-115. In one embodiment, the user may adjust the values for any of inputs 111-115 and the device configuration application may recalculate the values of outputs 116-117. If a user adjustment of any of the input values 111-113 results in a change of the output value 116 from NO to YES, the corresponding device configuration may be updated (e.g., display brightness level turned down or WLAN or WAN receivers turned OFF). In one embodiment, GUI 100 additionally includes selectable input 118 which, when selected, causes the device configuration application to automatically configure the device configuration settings to allow the user to achieve their goal of completing consumption of the electronic publication before the battery on the user device dies. Additional details of the device configuration application are described below.

Figure 2:
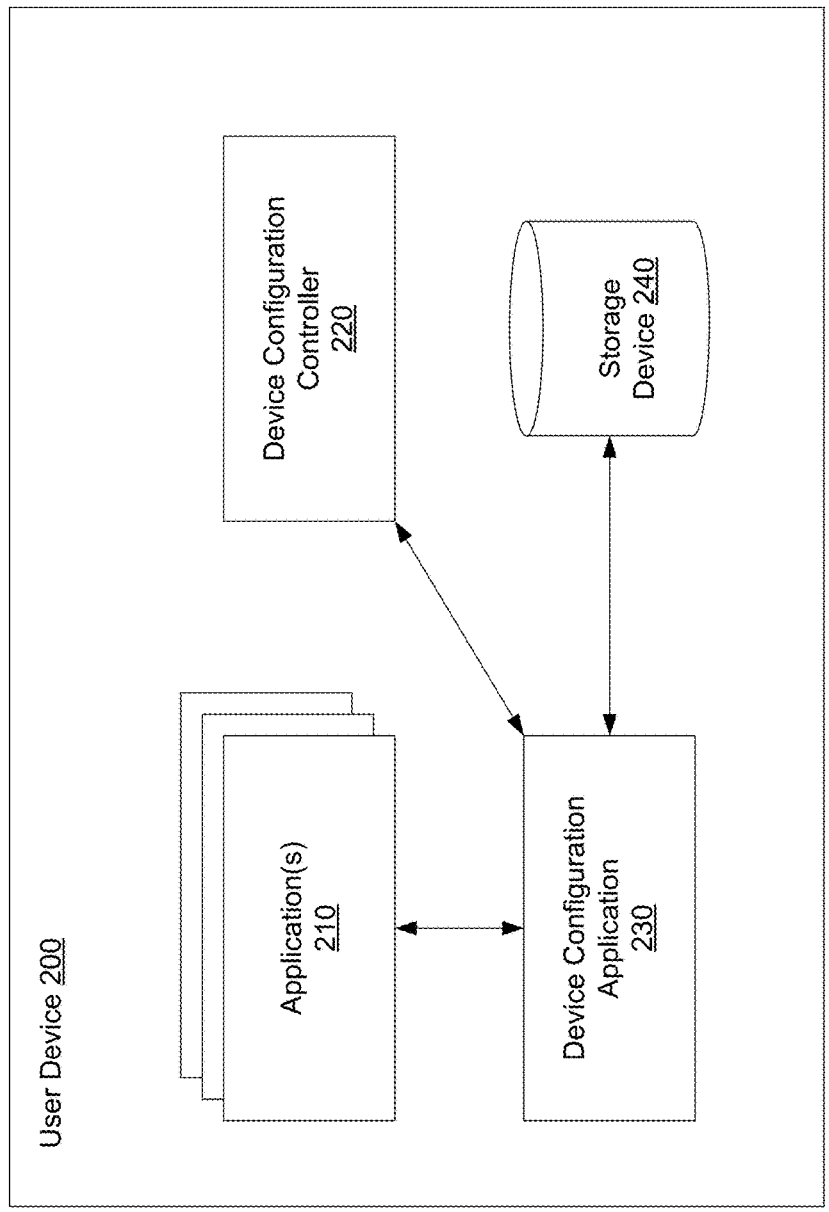
FIG. 2 is a block diagram illustrating a user device configured for goal oriented device configuration, according to an embodiment.

FIG. 2 is a block diagram illustrating a user device 200 configured for goal oriented device configuration, according to an embodiment. In one embodiment, the user device 200 includes one or more applications 210, device configuration controller 220, device configuration application 230 and storage device 240. User device 200 may include for example, an electronic book reader, cellular telephone, smartphone, personal digital assistant (PDA), portable media player, tablet computer, electronic pad, netbook, desktop computer, notebook computer, or the like. In one embodiment, device configuration application 230 generates and provides graphical user interface (GUI) 100, as described above with respect to FIG. 1B.

Applications 210 may be computer application programs that offer varying functionality. For example, one of applications 210 may be an electronic reader application that enables consumption of one or more types of digital content and electronic media items. The digital content and electronic media items may include electronic books (ebooks) such as electronic textbooks and/or other electronic publications (electronic versions of publications) such as electronic magazines, digital newspapers, digital audio books, electronic journals, real simple syndication (RSS) feeds, etc. One of applications 210 may be a media player that enables playback of digital video (e.g., movies, television, short clips, etc.), images (e.g., art, photographs, etc.), and multimedia content. One of applications 210 may be a navigation application which displays a map and provides navigation directions to a selected location. In one embodiment, applications 210 may include any other types of entertainment, productivity, communication, social networking, or other types of applications.

In one embodiment, device configuration controller 220 manages device configuration settings on user device 200. For example, device configuration controller 220 can activate, deactivate or adjust device components including a display, a WLAN receiver, a WAN receiver, a GPS receiver, and various other background processes. In one embodiment, device configuration controller 220 can receive instructions from device configuration application 230 to activate, deactivate or adjust the configuration settings of one or more of these device components. Similarly, device configuration controller 220 can report current device configuration settings to device configuration application including, a display brightness level, a status of the WLAN, WAN, or GPS receivers, a status of various background processes, etc.

Storage device 240 may include a main memory, such as read-only memory (ROM), flash memory, dynamic random access memory (DRAM) (such as synchronous DRAM (SDRAM), etc.), or a static memory, such as flash memory, static random access memory (SRAM), etc. In other embodiments, storage device 240 may include some other type of storage device for storing information in a form (e.g., software, processing application) readable by a machine (e.g., a computer). The storage device 240 may include a machine-readable medium including, but not limited to, magnetic storage medium (e.g., floppy diskette), optical storage medium (e.g., CD-ROM), magneto-optical storage medium, erasable programmable memory (e.g., EPROM and EEPROM), flash memory; or another type of medium suitable for storing electronic instructions.

Figure 3A:
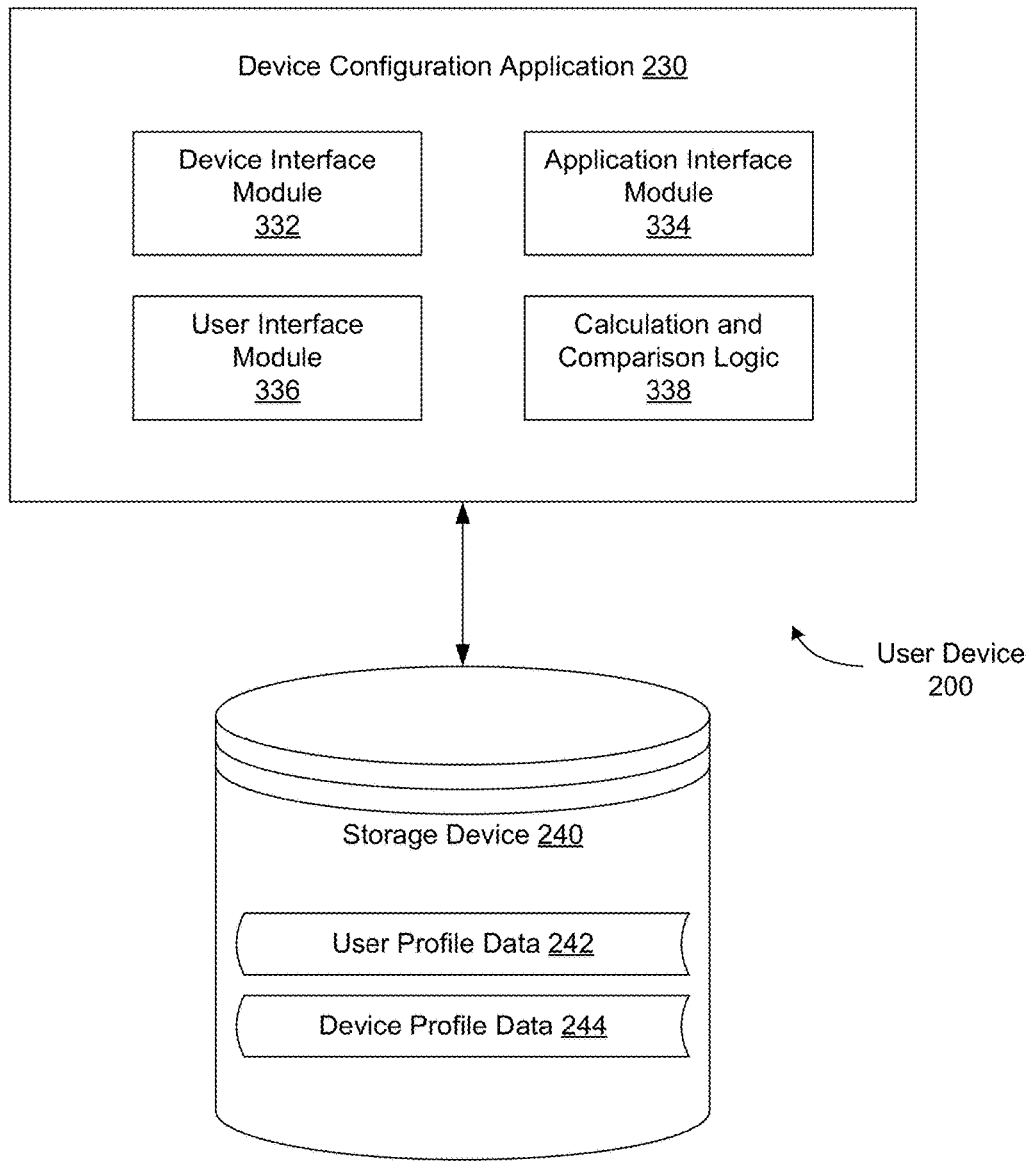
FIG. 3A is a block diagram illustrating a device configuration application, according to an embodiment.

FIG. 3A is a block diagram illustrating a device configuration application 230 that is included in user device 200, according to an embodiment. In one embodiment, device configuration application 230 may include device interface module 332, application interface module 334, user interface module 336, and calculation and comparison logic 338. This arrangement of modules and components may be a logical separation, and in other embodiments, these modules or other components can be combined together or separated in further components, according to a particular embodiment. In one embodiment, device configuration application 230 is connected to storage device 240 having a data store, which may be, for example, a file system, database or other data management layer resident on a data storage device such as a disk drive, RAM, ROM, flash memory, etc. The data store may include user profile data 242 and device profile data 244. In one embodiment, user device 200 may include both device configuration application 230 and storage device 240. In another embodiment, storage device 240 may be external to user device 200 and may be connected to user device 200 over a network or other connection. In other embodiments, user device 200 may include different and/or additional components which are not shown in order to simplify the description.

In one embodiment, device interface module 332 handles communication between device configuration application 230 and other components and systems on user device 200. For example, device interface module 332 can communicate with device configuration controller 220 of user device to provide instructions to activate, deactivate or adjust the configuration settings of one or more of a display brightness level, a status of a WLAN, WAN or GPS receiver, a status of various other background processes, a battery power level, or other configuration settings. Similarly, device interface module 332 query device configuration controller 220 to receive an indication of current device configuration settings.

In one embodiment, application interface module 334 handles communication between device configuration application 230 and other applications on user device 200, such as applications 210. For example, application interface module 334 may receive information from an electronic reader application to determine how many pages are remaining in an electronic publication being consumed, a user's average reading speed, current font and margin sizes, and other information. In other embodiments, application interface module 334 may receive other goal related information from other applications 210 including, for example, an amount of time remaining in the playback of a video or audio file, an amount of time it will take for a user to navigate to a selected location, an amount of time a telephone call or video conference call is expected to last, etc.

In one embodiment, user interface module 336 generates and presents a user interface, such as user interface 100, to enable interaction between device configuration application 230 and a user of user device 200. In one embodiment, user interface module 336 receives user input entered through GUI 100. User interface module 336 may provide that information to calculation and comparison logic 338. In one embodiment, user interface module 336 may present output information in GUI 100 indicating whether or not the user will be able to achieve the desired goal, a suggestion of how to adjust various device configuration settings, or a result of an automatic configuration of the device configuration settings.

In one embodiment, calculation and comparison logic 338 takes input received through device interface module 332, application interface module 334 and user interface module 336 and makes various calculations and comparisons to determine whether or not the user will be able to achieve the desired goal. For example, in one embodiment, calculation and comparison logic 338 may receive information identifying a goal from application interface module 334, such as a number of pages remaining in an electronic publication, and one or more user characteristics such as a reading speed of the user. The user characteristics may be stored as part of user profile data 242, may be obtained directly from the electronic reader application via application interface module 334 or may be obtained from user input received via user interface module 336. Calculation and comparison logic 338 may additionally obtain current device configuration settings via device interface module 332 or from user input received via user interface module 336. Calculation and comparison logic 338 may calculate a remaining battery life for user device 200 based on the current device configuration settings, using for example, historical data stored in device profile data 244, and compare the remaining battery life to an expected amount of time until the user reaches the application goal determined based on the user characteristics. If the user will not complete consumption of the electronic publication with the remaining battery life, calculation and comparison logic 338 may provide instructions to device interface module 332 to adjust one or more of the device configuration settings to decrease a rate at which the battery power level of the device is drained, extend an amount of time for which the current amount of power that is available from the battery in the user device allows device functionality related to the task and allow the user to reach the application goal.

FIG. 3B is a diagram illustrating a user profile data structure 242, according to an embodiment. In one embodiment, user profile data structure 242 stores user characteristics and preferences associated with a user of user device 200. User profile data structure 242 may include different profiles for different users. In one embodiment, user profile data structure 242 includes characteristics such as reading speed, expressed as a value in words per minute. In one embodiment, an electronic reader application tracks a user's reading speed over time and stores the speed in user profile data 242. In another embodiment, the reading speed is determined by a remotely located networked device (e.g., a server) and the data is sent to user device 200. Also, reading speed can be device specific, and there may be different reading speeds for a dedicate electronic reader, smartphone, tablet, etc. In one embodiment, user profile data structure 242 further includes user preferences such as minimum or preferred font and margin sizes, minimum or preferred screen brightness levels, etc. As described below, device configuration application 230 may access user profile data structure 242 and utilize the user characteristics and preferences contained therein when performing a goal oriented device configuration of user device 200.

FIG. 3C is a diagram illustrating a device profile data structure 244, according to an embodiment. In one embodiment, device profile data structure 244 stores data indicating the amount of power utilized by user device give certain configuration settings. In one embodiment, device profile data 244 includes a value indicative of the amount of power consumed by each screen rendering on the device display. In one embodiment, a screen rendering may include setting a value each pixel in the display. In another embodiment, a screen rendering may include an incremental change from a previous screen rendering, wherein only a portion of the pixel in the display are redrawn. The value may be expressed, for example, as an amount of power per page rendered. Device configuration application may use this value to determine how many screen renderings can be performed given the current battery power level. In one embodiment, device profile data 244 includes values associated with the front light, WLAN receiver and WAN receiver, which indicate the amount of power consumed in a given period of time when the device is has the indicated configuration settings. As described below, device configuration application 230 may access device profile data structure 244 and utilize the data contained therein in order to calculate the remaining battery life of the user device 200 with a given set of device configuration settings.

Figure 4A:
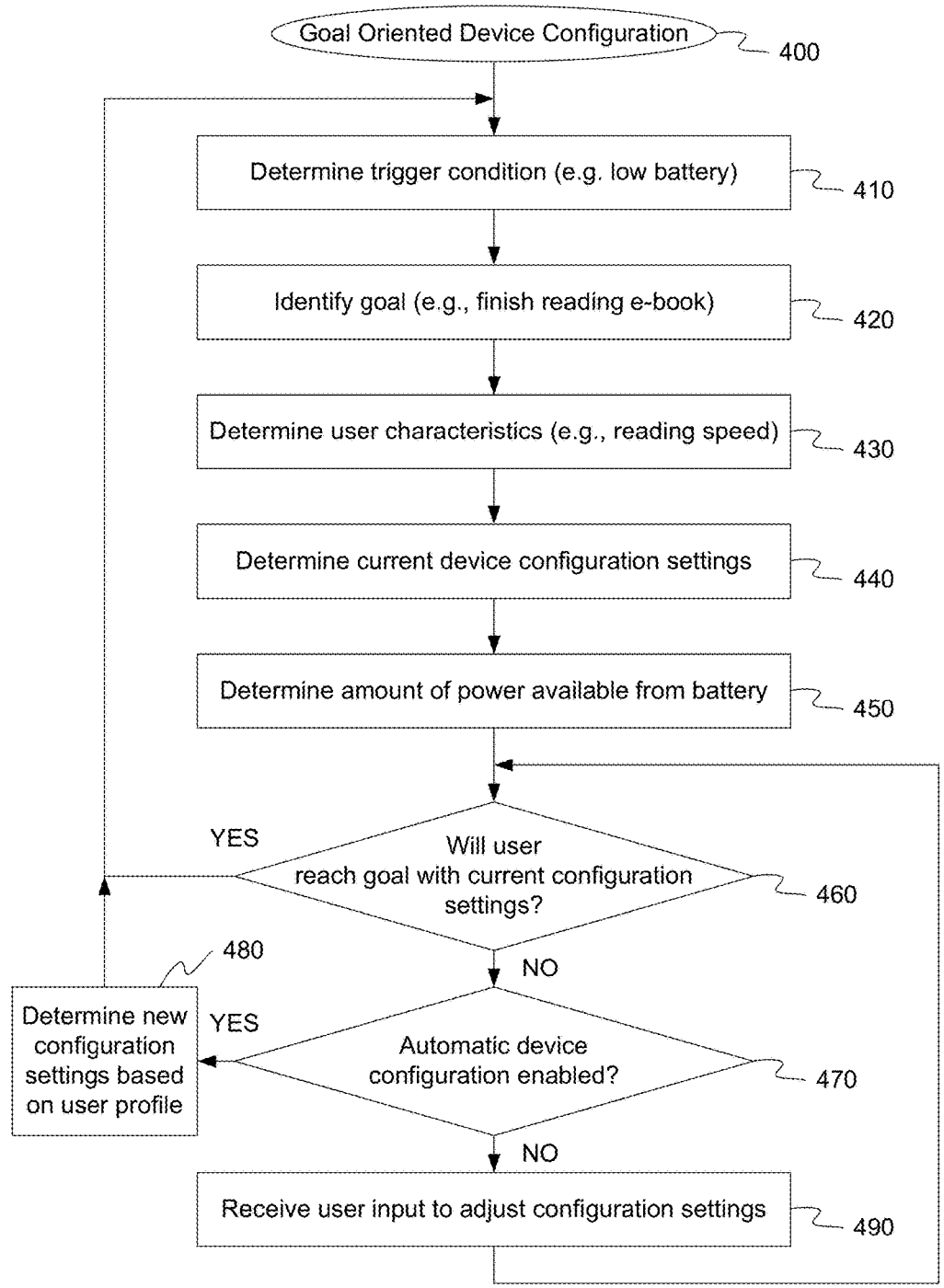
FIGS. 4A-4B are flow diagrams illustrating a goal oriented device configuration method, according to an embodiment.

FIG. 4A is a flow diagram illustrating a goal oriented device configuration method, according to an embodiment of the present invention. The method 400 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to adjust one or more device configuration settings to decrease a rate at which the battery power level of the device is drained, extend an amount of time for which the current amount of power that is available from the battery in the user device allows device functionality related to the task and allow a user to complete consumption of an electronic publication using the increased remaining battery life. In one embodiment, method 400 may be performed by device configuration application 230, as shown in FIGS. 2 and 3.

Referring to FIG. 4A, at block 410, method 400 determines a triggering condition. In one embodiment, device interface module 332 receives an indication of a power condition on the user device 200 from device configuration controller 220. For example, the power condition may include a battery power level falling below a defined threshold. In another embodiment, device interface module 332 or application interface module 334 may detect an occurrence of a time condition indicating sustained use of the user device 200 for a period of time. For example, a user may begin playback of a video, initiate a navigation mode, or set the user device to an "airplane mode." Each action may indicate that user device 200 will be in use for a period of time. In another embodiment, user interface module 336 may receive a manual request from the user to initiate goal oriented device configuration.

At block 420, method 400 identifies an application goal. In one embodiment, application interface module 334 receives information from an electronic reader application identifying how many pages are remaining in an electronic publication being consumed. In other embodiments, application interface module 334 may receive other goal related information from other applications 210 including, for example, an amount of time remaining in the playback of a video or audio file, an amount of time it will take for a user to navigate to a selected location, an amount of time a telephone call or video conference call is expected to last, etc. In another embodiment, user interface module 336 may receive manual user input specifying the application goal.

At block 430, method 400 determines user characteristics impacting power consumption associated with achieving the goal. In one embodiment, application interface module 334 receives one or more user characteristics, such as a reading speed of the user, from an electronic reader application on user device 200. In one embodiment, the electronic reader application may monitor user interactions with the user device over time, record information pertaining to the user's reading speed for certain electronic publications, and record that information as part of user profile data 242. In another embodiment, user interface module 336 receives user input (e.g., through GUI 100) indicating a user's typical or expected reading speed or other user characteristics which may impact power consumption associated with achieving the goal.

At block 440, method 400 determines current device configuration settings. In one embodiment, device interface module 332 receives an indication of current device configuration settings including one or more of a display brightness level, a status of a WLAN, WAN or GPS receiver, a status of various other background processes, or other configuration settings. In another embodiment, user interface module 336 receives user input (e.g., through GUI 100) indicating a current device configuration settings which may impact the remaining battery life of the device.

At block 450, method 400 determines an amount of power available from the batter in the user device 200. In one embodiment, calculation and comparison logic 338 may calculate the amount of power available from the battery based on the current device configuration settings. Calculation and comparison logic 338 may use historical data, stored as device profile data 244, which indicates the remaining battery life in past situations when the device had the same or similar device configuration settings. In another embodiment, calculation and comparison logic 338 may use an algorithm that receives the current device configuration settings as inputs and outputs an expected remaining battery life. In one embodiment, the remaining battery life may be expressed as period of time (i.e., given the current device configuration settings, the battery will be expected to last for some number of days, hours, minutes or seconds.) In another embodiment, the remaining battery life may be expressed as a number of screen renderings. Certain types of display technologies, such as bistable displays, such as electrophoretic displays (EPDs), electrowetting displays, etc., may use a relatively high amount of power to initially render data for display on the screen (e.g., data associated with content of a page of an electronic publication) but use a relatively low amount of power to continue display using the screen. Thus, the number of screen renderings may have more of an impact on the battery life than simply the amount of time the device is used when the device is being used as an eReader (or other device primarily used for reading), as an electronic sign (e.g., product price tag on a shelf/box/packaging, advertisement/billboard, etc.), as a wearable device (e.g., smart watch, etc.), as a second screen (e.g., for a mobile phone or tablet), as a notification device (e.g., show missed calls or present other notification-related information/messages), etc. Accordingly, calculation and comparison logic 338 may use data from device profile data 244 indicative of the amount of power consumed by each screen rendering to determine how many screen renderings can be performed given the current battery power level.

At block 460, method 400 determines whether the user will reach the application goal with the current device configuration settings. In one embodiment, calculation and comparison logic 338 may compare the remaining battery life to an expected amount of time, or a number of screen renderings (i.e., page turns), until the user reaches the application goal determined based on the user characteristics. If the user will reach the application goal before the battery dies, method 400 returns to block 410.

If the user will not reach the application goal, at block 470, method 400 determines whether automatic device configuration is enabled. In one embodiment, calculation and comparison logic 338 consults user profile data 242 to determine whether the user has configured automatic device configuration. In another embodiment, user interface module 336 receives user input (i.e., the selection of input 118) indicating a desire for automatic device configuration.

If automatic device configuration is enabled, at block 480, method 400 automatically determines new device configuration settings based on user profile data 242. In one embodiment, device interface module 332 configures the one or more device configuration settings according to weighted user preferences in user profile data 242. For example, the device configuration application may disable certain components of the user device that the user has ranked of lesser importance in order to decrease a rate at which the battery power level of the device is drained and extend an amount of time for which the current amount of power that is available from the battery in the user device allows device functionality related to the task. There may be other components that the user has ranked of higher importance which should not be disabled or adjusted if at all possible. Device interface module 332 may configure the device configuration settings to decrease a rate at which the battery power level of the device is drained while minimizing the impact to the user experience of disabling certain components or adjusting configuration settings. In one embodiment, application interface module 334 may adjust certain screen rendering options in order to reduce the number of screen renderings associated with completion of the task. For example, application interface module 334 may adjust the font size, margins, line spacing, etc. in order to fit the remaining portion of the electronic publication into the number of screen renderings remaining.

If automatic device configuration is not enabled, at block 490, method 400 receives user input to adjust the device configuration settings. In another embodiment, user interface module 336 receives user input including adjustments to the one or more of the device configuration settings, and configures those settings according to the user input. For example, the user may manually disable certain components (e.g., a WLAN receiver) or decrease certain settings (e.g., display brightness level) in order to decrease a rate at which the battery power level of the device is drained.

Figure 4B:
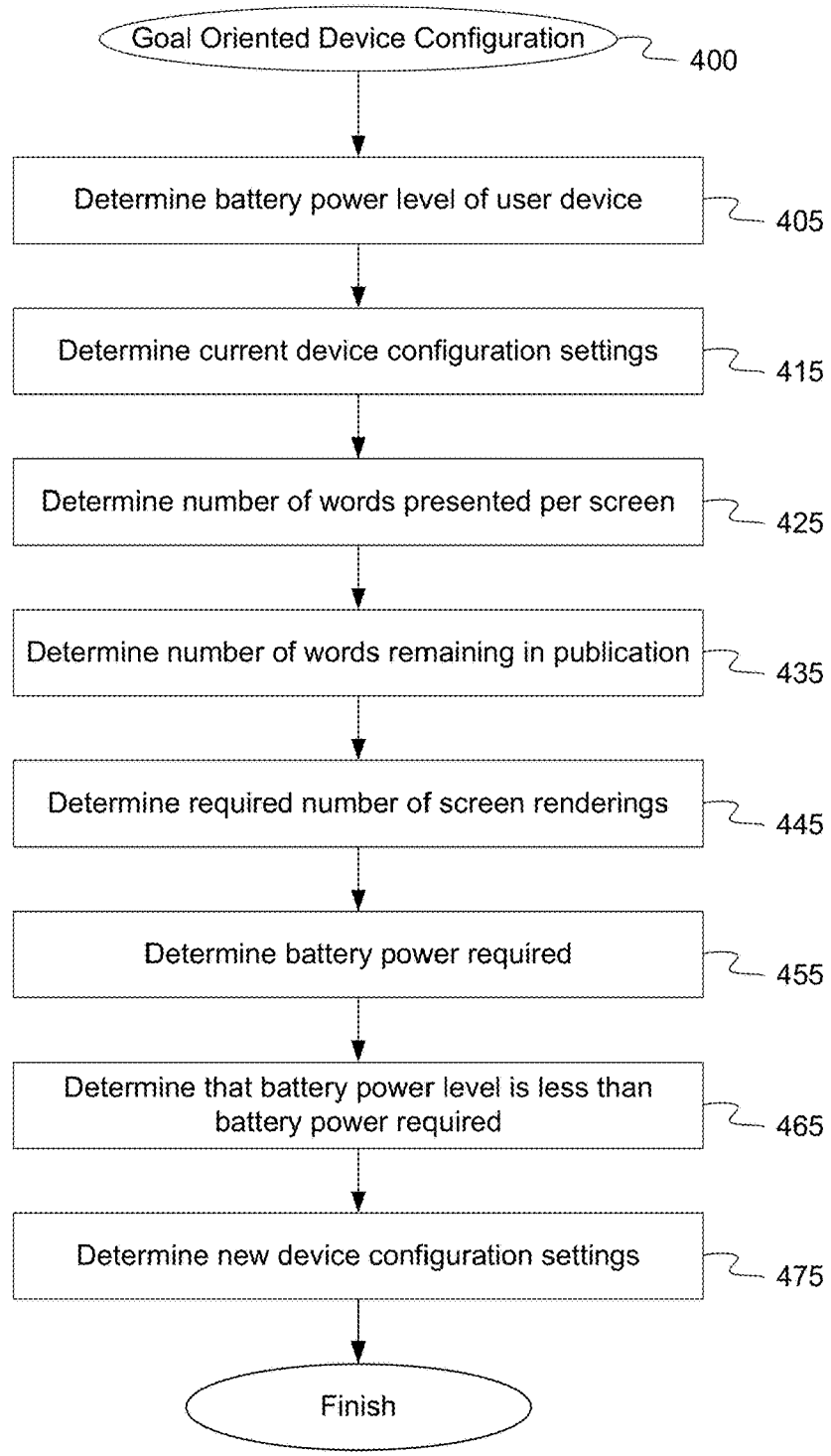

FIG. 4B is a flow diagram illustrating a goal oriented device configuration method, according to an embodiment of the present invention. The method 401 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to adjust one or more device configuration settings to decrease a rate at which the battery power level of the device is drained and allow a user to complete consumption of an electronic publication using the increased remaining battery life. In one embodiment, method 401 may be performed by device configuration application 230, as shown in FIGS. 2 and 3.

Referring to FIG. 4B, at block 405, method 401 determines a current battery power level of the user device 200. At block 415, method 401 determines current device configuration settings. In one embodiment, device interface module 332 receives an indication of current device configuration settings including one or more of a current font size, a current margin size and a current font type. In another embodiment, user interface module 336 receives user input (e.g., through GUI 100) indicating current device configuration settings which may impact the remaining battery life of the device.

At block 425, method 401 determines a number of words presented in a screen rendering using the current device configuration settings. Given the physical size of the screen on the user device and current font size, margin size and font type, on average, a certain number of words may be presented per screen rendering on the display of user device 200. Thus, the number of words determined at block 401 may be determined based on device-specific hardware settings (e.g., the physical size of the screen) as well as user configurable software settings (e.g., font type, font size, margin size, magnification, etc.). Application interface module 334 may determine the number of words that can fit on a page with the current settings based on an average word size.

At block 435, method 401 determines a remaining number of words in at least a remaining portion of an electronic publication being presented by the user device. The remaining portion may include for example, the rest of a given chapter or section, or the rest of the entire electronic publication. In one embodiment, the remaining number of words represents how many words in the chapter or book are yet to be rendered for display on the screen of the user device. At block 445, method 401 determines a required number of screen renderings to display the remaining portion of the electronic publication using the number of words presented by a screen rendering. In one embodiment, calculation and comparison logic 338 calculates the number of screen renderings by dividing the number of words in the remaining portion determined at block 435 by the number of words presented per screen rendering determined at block 425.

At block 455, method 401 determines an amount of battery power required to perform the required number of screen renderings determined at block 445. In one embodiment, device interface module 332 may consult device profile data structure 244 to determine the amount of power consumed per screen rendering and may multiply that amount by the required number of screen renderings. At block 465, method 401 determines that the battery power level of the user device determined at block 405 is less than the amount of battery power required to perform the remaining number of screen renderings, as determined at block 455. In one embodiment, calculation and comparison logic 338 compares the two amount to make the determination.

At block 475, method 401 determines one or more new device configuration settings to decrease a rate at which the battery power level of the device is drained and allow the device to present the remaining portion of the electronic publication prior to the battery power level being depleted below a threshold that is associated with the minimum amount of power the user device requires to present the electronic book for reading. In one embodiment, calculation and comparison logic 338 determines a combination of font size, margin size and font type that will allow the number of remaining words in the electronic publication to be displayed in a number of screen renderings that can be performed with the current battery power level of the device. In one embodiment, only one of the configuration settings may be changed. In other embodiments, two or more of the configuration settings may be changed.

In one embodiment, the task associated with a goal may include providing navigation directions to a selected location. In this embodiment, the device configuration settings may be the same or different than those discussed above. For example, device configuration settings may include the status of a GPS receiver in the device, whether a visual indication of the navigation directions is presented on the display of the device, whether an audible indication of the navigation directions is presented through a speaker of the device, etc. In one embodiment, the device configuration application 230 determines an amount of remaining battery life for the device given the current device configuration. The user characteristics that impact power consumption associated with the task may include, the mode of transportation being utilized (e.g., car, train, bus, bicycle, walking) how fast the user is traveling, preferred routes to take or avoid on the way to the destination, etc. In one embodiment, the device configuration application 230 determines an estimated period of time associated with travel to the selected location, based on the user characteristics. Device configuration application 230 may compare the remaining battery life to the estimated period of time, and if the estimated period of time exceeds the remaining battery life, may reconfigure certain device configuration settings. For example, the device configuration application 230 may disable certain components of the user device that the user has ranked of lesser importance in order to decrease a rate at which the battery power level of the device is drained. There may be other components that the user has ranked of higher importance which should not be disabled or adjusted if at all possible. Device interface module 332 may configure the device configuration settings to decrease a rate at which the battery power level of the device is drained while minimizing the impact to the user experience of disabling certain components or adjusting configuration settings.

Figure 5:
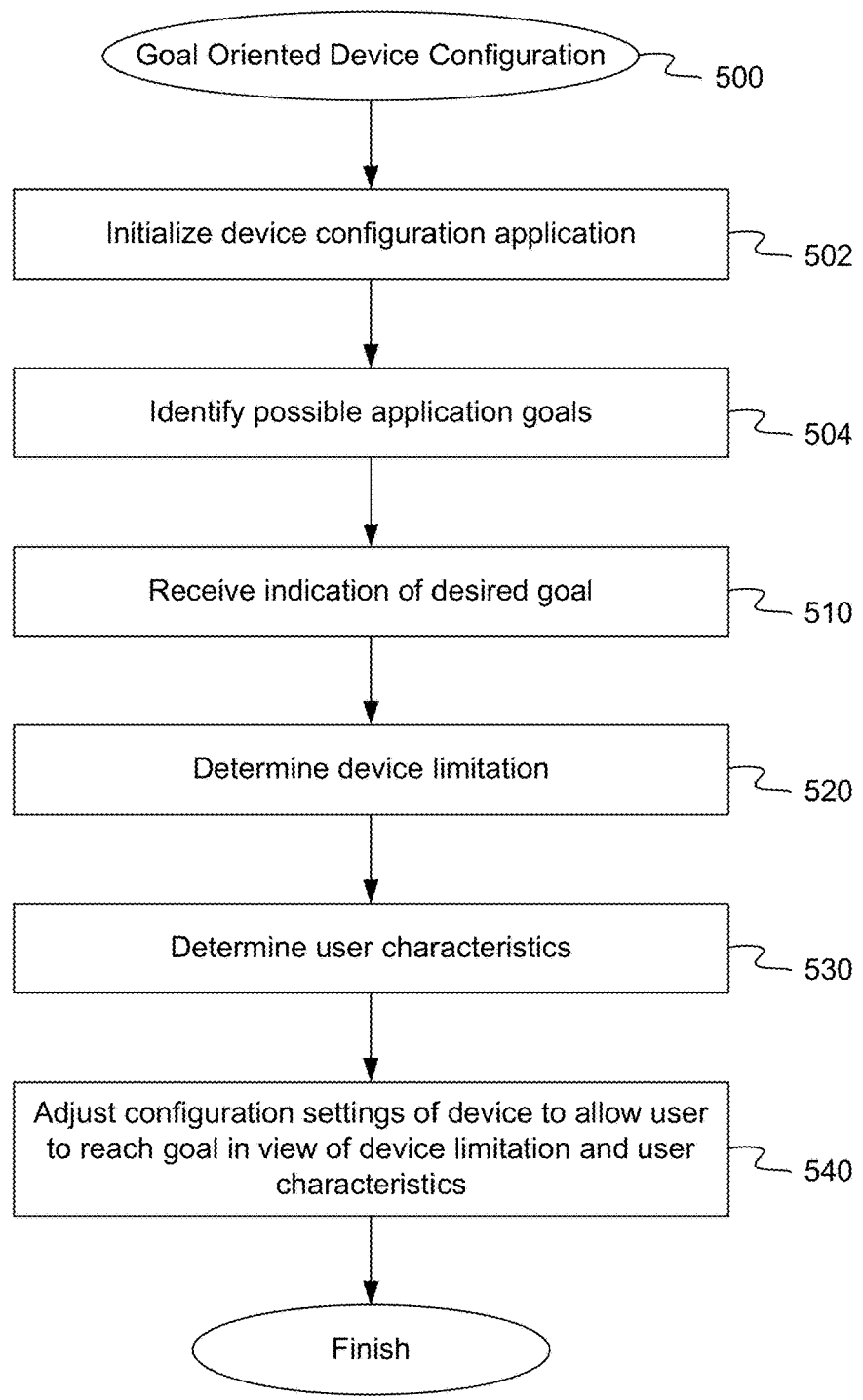
FIG. 5 is a flow diagram illustrating a goal oriented device configuration method, according to an embodiment.

FIG. 5 is a flow diagram illustrating a goal oriented device configuration method, according to an embodiment. The method 500 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to adjust one or more device configuration settings to allow completion of an application goal in view of one or more user characteristics given a limitation of a user device. In one embodiment, method 500 may be performed by device configuration application 230, as shown in FIGS. 2 and 3.

Referring to FIG. 5, at block 502, method 500 initializes device configuration application 230. In one embodiment, device interface module 332 receives an indication of a power condition on the user device 200, detects an occurrence of a time condition indicating sustained use of the user device 200 for a period of time, or receives a manual request from the user to initiate goal oriented device configuration.

At block 504, method 500 identifies one or more possible application goals. In one embodiment, application interface module 334 determines one or more currently active applications 210 and queries those applications for information pertaining to their status. For example, if an electronic reader application is active, application interface module 334 may receive information identifying how many pages are remaining in a current chapter or section, or how many pages are remaining in the entire electronic publication being consumed. In other embodiments, application interface module 334 may receive other goal related information from other applications 210 including, for example, an amount of time remaining in the playback of a video or audio file, an amount of time it will take for a user to navigate to a selected location, etc.

At block 510, method 500 receives an indication of a desired goal from among the possible application goals identified at block 504. In one embodiment, user interface module 336 may present the possible application goals in a user interface, as shown in display 102 of FIG. 1, and may receive manual user input selecting a particular application goal.

At block 520, method 500 determines a device limitation. The device limitation may include any condition of the user device that can impact a period of time in which the task is to be completed. For example, the limitation of the device may include the remaining battery life for the user device determined based on current device configuration settings. The remaining battery life may be representative of the period of time in which the task is to be completed, as the user wishes to complete the task before the device battery dies.

At block 530, method 500 determines user characteristics that impact power consumption associated with the task. In one embodiment, application interface module 334 receives one or more user characteristics, such as a reading speed of the user, or a preferred font type, font size or margin size, from an electronic reader application on user device 200. In one embodiment, the electronic reader application may monitor user interactions with the user device over time, record information pertaining to the user's reading speed for certain electronic publications, and record that information as part of user profile data 242. In another embodiment, user interface module 336 receives user input (e.g., through GUI 100) indicating a user's typical or expected reading speed or other user characteristics which may impact power consumption associated with achieving the goal.

At block 540, method 500 adjusts device configuration settings to allow the user to reach the goal in view the user characteristics given the limitation of the device. In one embodiment, device interface module 332 configures the one or more device configuration settings according to weighted user preferences in user profile data 242. For example, the device configuration application may disable certain components of the user device that the user has ranked of lesser importance in order to decrease a rate at which the battery power level of the device is drained. There may be other components that the user has ranked of higher importance which should not be disabled or adjusted if at all possible. Device interface module 332 may configure the device configuration settings to decrease a rate at which the battery power level of the device is drained while minimizing the impact to the user experience of disabling certain components or adjusting configuration settings. In another embodiment, user interface module 336 receives user input including adjustments to the one or more of the device configuration settings, and configures those settings according to the user input. For example, the user may manually disable certain components (e.g., a WLAN receiver) or decrease certain settings (e.g., display brightness level) in order to decrease a rate at which the battery power level of the device is drained.

Figure 6A:
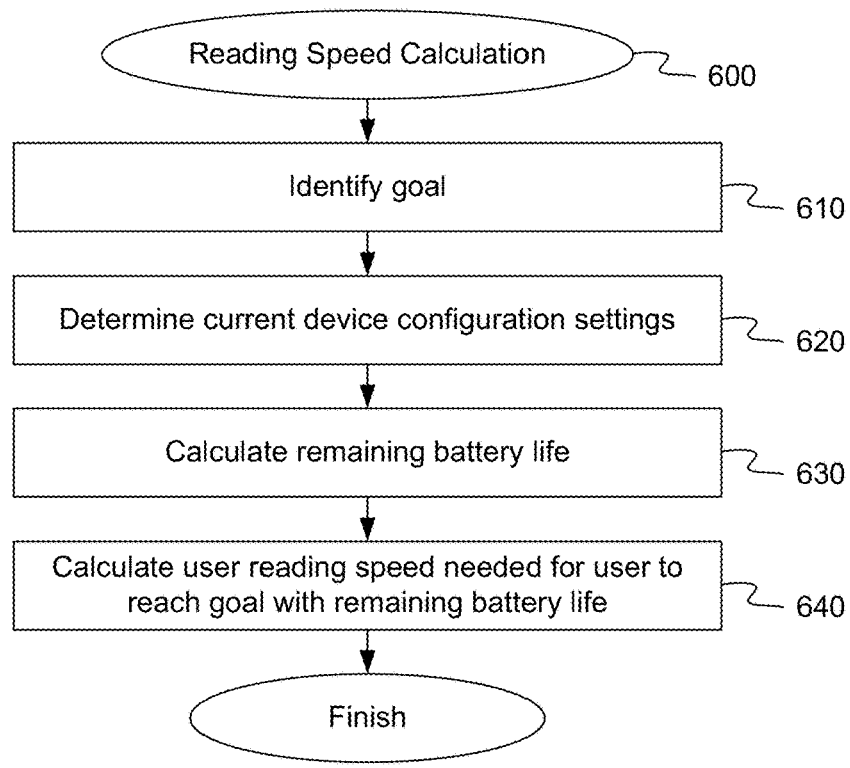
FIG. 6A is a flow diagram illustrating a reading speed calculation method, according to embodiment.

FIG. 6A is a flow diagram illustrating a reading speed calculation method, according to embodiment. The method 600 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to calculate a reading speed necessary for the user to complete consumption of an electronic publication given the remaining battery life. In one embodiment, method 600 may be performed by device configuration application 230, as shown in FIGS. 2 and 3.

Referring to FIG. 6, at block 610, method 600 identifies an application goal, such as completing consumption of an electronic publication. At block 620, method 600 determines the current device configuration settings including, for example, a display brightness level, an activation status of a WLAN receiver, an activation status of a WAN receiver, or an activation status of a GPS receiver. At block 630, method 600 calculates a remaining battery life based on the current device configuration settings. At block 640, method 600 calculates a user reading speed necessary for the user to complete consumption of an electronic publication given the remaining battery life. In one embodiment, calculation and comparison logic 338 divides the number of pages remaining in the electronic publication by the amount of time associated with the remaining battery life in order to determine the user reading speed.

Figure 6B:
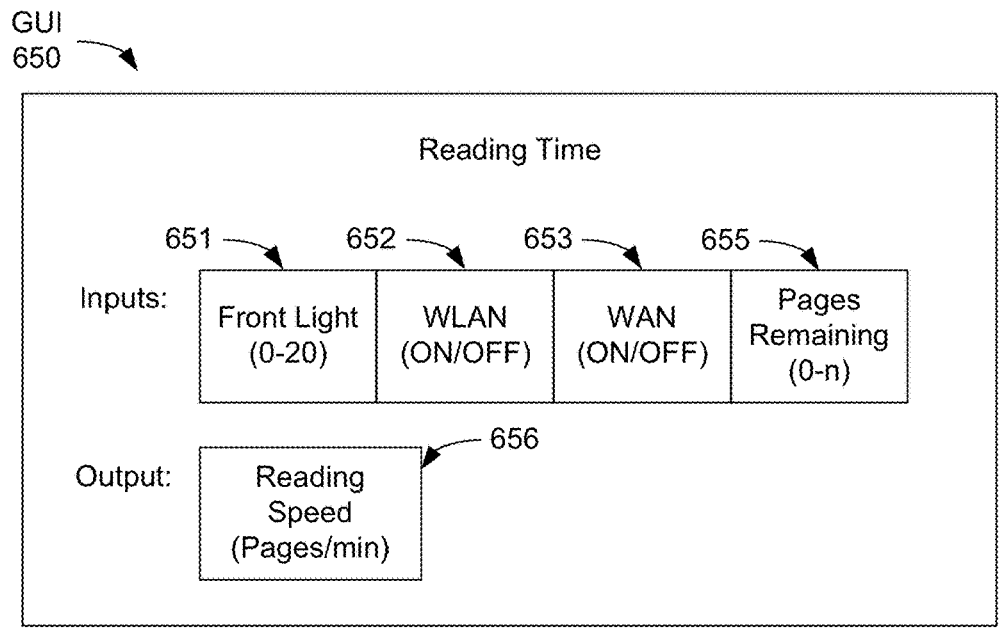
FIG. 6B is a diagram illustrating a user interface for goal oriented device configuration, according to an embodiment.

FIG. 6B is a diagram illustrating a user interface 650 for goal oriented device configuration, according to an embodiment. In one embodiment, user interface 650 may be a graphical user interface (GUI). User interface 650 may include a number of inputs 651-655 and one or more outputs 656 related to goal oriented device configuration. In one embodiment, the inputs include a display brightness level (i.e., front light) 651, a status of a WLAN receiver 652, a status of a WAN receiver 653 and a number of pages remaining 655 in an electronic publication. In one embodiment, the outputs include a textual indication 656 of a user reading speed necessary for the user to complete reading the number of pages remaining 655 before the battery dies. In other embodiments, GUI 650 may include different or additional inputs and outputs.

Figure 7A:
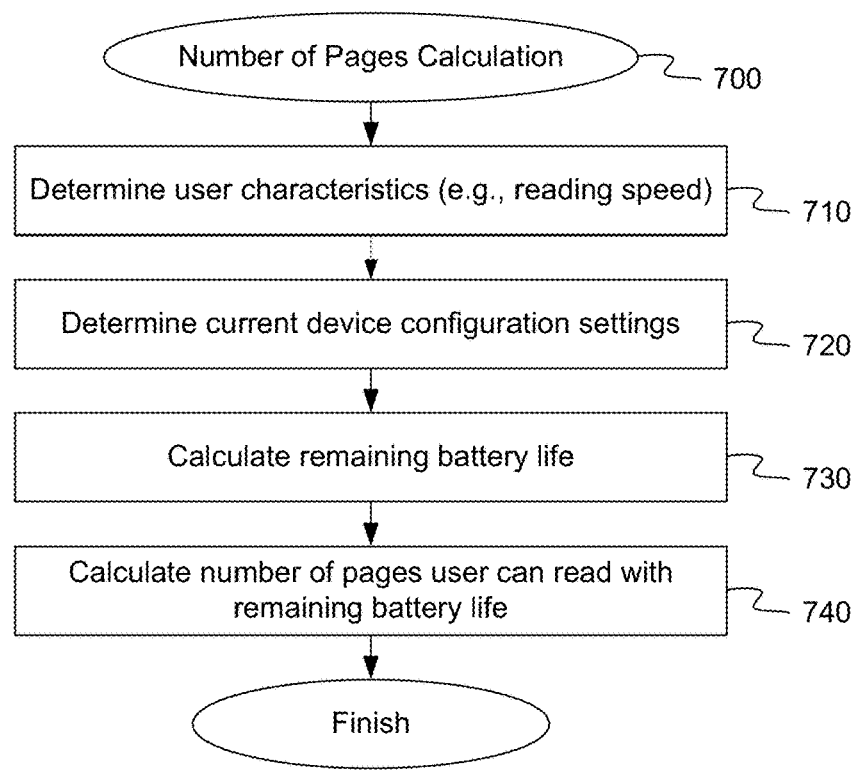
FIG. 7A is a flow diagram illustrating a number of pages calculation method, according to embodiment.

FIG. 7A is a flow diagram illustrating a number of pages calculation method, according to embodiment. The method 700 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to calculate a number of pages of an electronic publication that the user can read given the remaining battery life. In one embodiment, method 700 may be performed by device configuration application 230, as shown in FIGS. 2 and 3.

Referring to FIG. 7, at block 710, method 700 determines a user characteristic that impacts power consumption associated with the task, such as a reading speed of the user. At block 720, method 700 determines the current device configuration settings including, for example, a display brightness level, an activation status of a WLAN receiver, an activation status of a WAN receiver, or an activation status of a GPS receiver. At block 730, method 700 calculates a remaining battery life based on the current device configuration settings. At block 740, method 700 calculates a number of pages of an electronic publication that the user can read given the remaining battery life. In one embodiment, calculation and comparison logic 338 multiplies the reading speed of the user by the amount of time associated with the remaining battery life in order to determine the user reading speed.

Figure 7B:
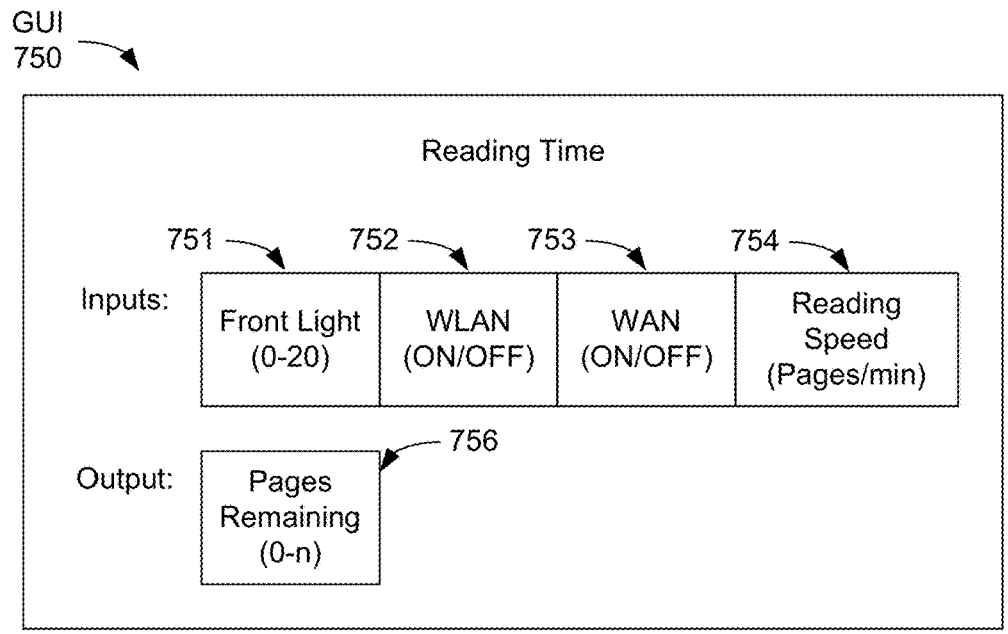
FIG. 7B is a diagram illustrating a user interface for goal oriented device configuration, according to an embodiment.

FIG. 7B is a diagram illustrating a user interface 750 for goal oriented device configuration, according to an embodiment. In one embodiment, user interface 750 may be a graphical user interface (GUI). User interface 750 may include a number of inputs 751-754 and one or more outputs

756 related to goal oriented device configuration. In one embodiment, the inputs include a display brightness level (i.e., front light) 751, a status of a WLAN receiver 752, a status of a WAN receiver 753 and a user reading speed 754. In one embodiment, the outputs include a textual indication 756 of number of pages of an electronic publication that the user can read given the remaining battery life. In other embodiments, GUI 750 may include different or additional inputs and outputs.

Figure 8A:
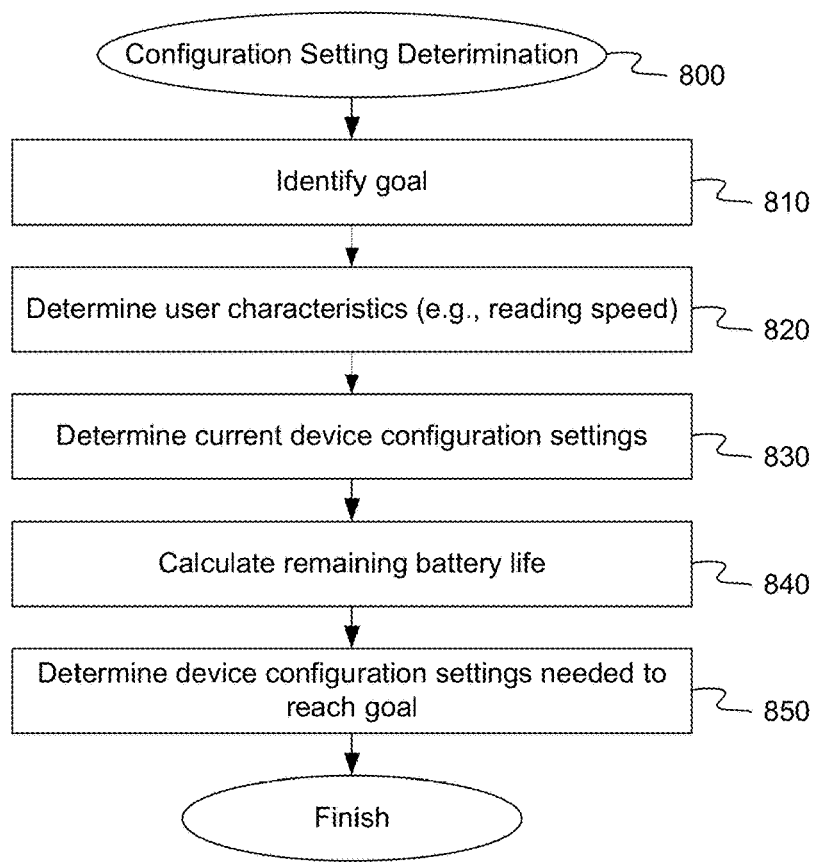
FIG. 8A is a flow diagram illustrating a configuration setting determination method, according to embodiment.

FIG. 8A is a flow diagram illustrating a configuration setting determination method, according to embodiment. The method 800 may be performed by processing logic that comprises hardware (e.g., circuitry, dedicated logic, programmable logic, microcode, etc.), software (e.g., instructions run on a processor to perform hardware simulation), firmware, or a combination thereof. The processing logic is configured to determine device configuration settings needed to reach a goal given the remaining battery life of the user device. In one embodiment, method 800 may be performed by device configuration application 230, as shown in FIGS. 2 and 3.

Referring to FIG. 8A, at block 810, method 800 identifies an application goal, such as completing consumption of an electronic publication. At block 820, method 800 determines a user characteristic that impacts power consumption associated with the task, such as a reading speed of the user. At block 830, method 800 determines the current device configuration settings including, for example, a display brightness level, an activation status of a WLAN receiver, an activation status of a WAN receiver, or an activation status of a GPS receiver. At block 840, method 800 calculates a remaining battery life based on the current device configuration settings. At block 850, method 800 determine device configuration settings needed to reach a goal given the remaining battery life of the user device. In one embodiment, calculation and comparison logic 338 determines whether the screen brightness level can be decreased, whether a WLAN receiver can be deactivated or whether a WAN receiver can be deactivated. In one embodiment, calculation and comparison logic 338 determines the effect that taking such an action would have on the remaining battery life and determines whether this increased battery life would be sufficient to allow the user to achieve the goal. In one embodiment, more than one of the screen brightness level, the WLAN receiver status, the WAN receiver status, or other configuration settings can be adjusted.

Figure 8B:
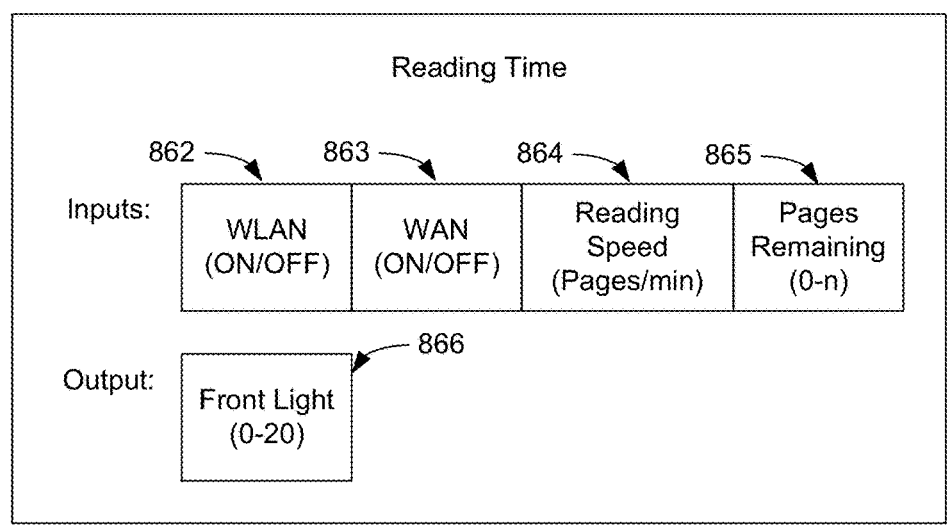
FIGS. 8B-8E are diagrams illustrating a user interface for goal oriented device configuration, according to an embodiment.

FIG. 8B is a diagram illustrating a user interface 860 for goal oriented device configuration, according to an embodiment. In one embodiment, user interface 860 may be a graphical user interface (GUI). User interface 860 may include a number of inputs 862-865 and one or more outputs 866 related to goal oriented device configuration. In one embodiment, the inputs include a status of a WLAN receiver 862, a status of a WAN receiver 863, a user reading speed 864 and a number of pages remaining 865. In one embodiment, the outputs include a textual indication 866 of a screen brightness level that will allow the user to complete reading the number of pages remaining 865 before the battery dies. In other embodiments, GUI 860 may include different or additional inputs and outputs.

Figure 8C:
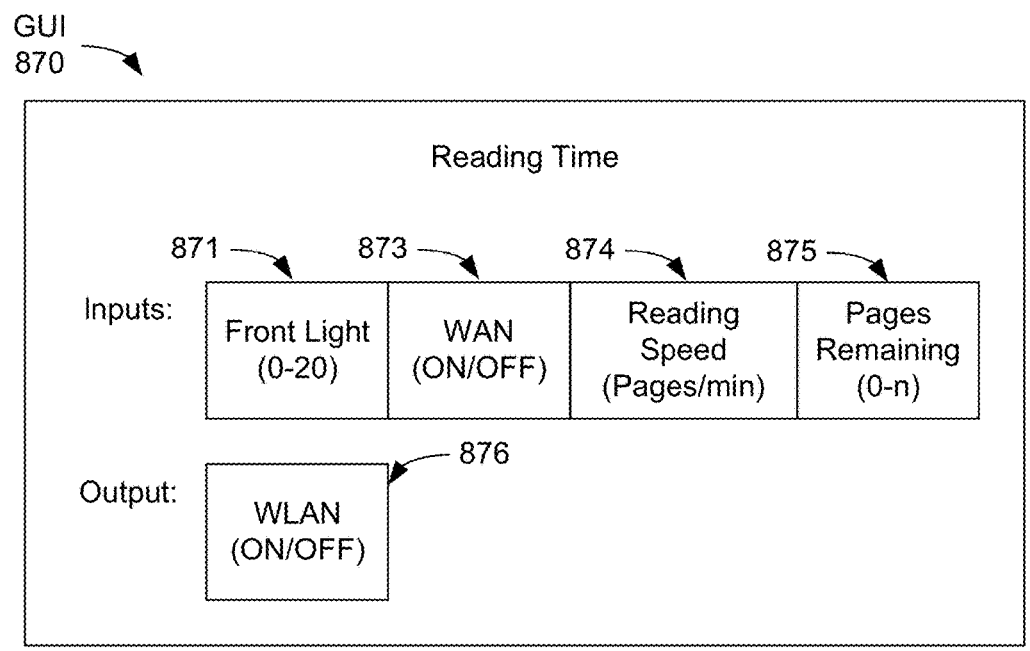

FIG. 8C is a diagram illustrating a user interface 870 for goal oriented device configuration, according to an embodiment. In one embodiment, user interface 870 may be a graphical user interface (GUI). User interface 870 may include a number of inputs 871-875 and one or more outputs 876 related to goal oriented device configuration. In one embodiment, the inputs include a screen brightness level 871, a status of a WAN receiver 873, a user reading speed 874 and a number of pages remaining 875. In one embodiment, the outputs include a textual indication 876 of a status of the WLAN receiver that will allow the user to complete reading the number of pages remaining 875 before the battery dies. In other embodiments, GUI 870 may include different or additional inputs and outputs.

Figure 8D:
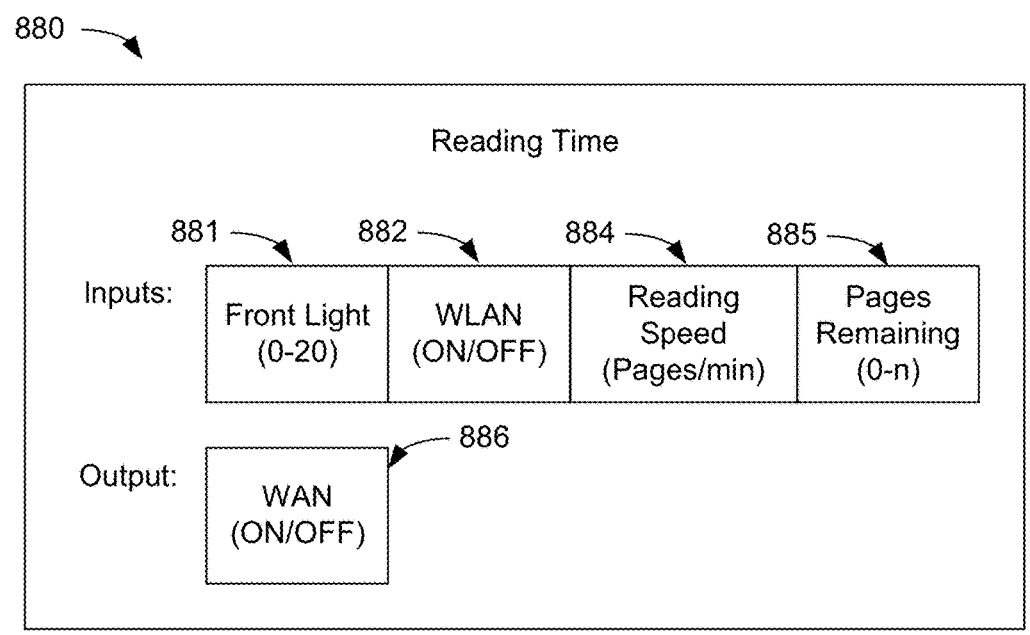

FIG. 8D is a diagram illustrating a user interface 880 for goal oriented device configuration, according to an embodiment. In one embodiment, user interface 880 may be a graphical user interface (GUI). User interface 880 may include a number of inputs 881-885 and one or more outputs 886 related to goal oriented device configuration. In one embodiment, the inputs include a screen brightness level 881, a status of a WLAN receiver 882, a user reading speed 884 and a number of pages remaining 885. In one embodiment, the outputs include a textual indication 886 of a status of the WLAN receiver that will allow the user to complete reading the number of pages remaining 885 before the battery dies. In other embodiments, GUI 880 may include different or additional inputs and outputs.

Figure 8E:
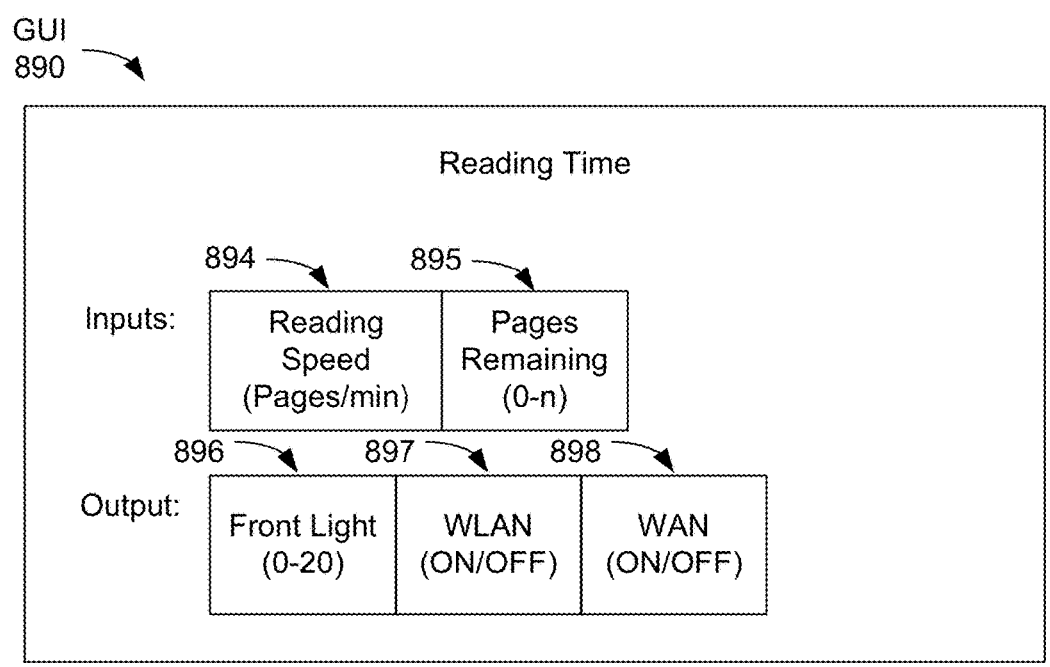

FIG. 8E is a diagram illustrating a user interface 890 for goal oriented device configuration, according to an embodiment. In one embodiment, user interface 890 may be a graphical user interface (GUI). User interface 890 may include a number of inputs 894-875 and one or more outputs 896-898 related to goal oriented device configuration. In one embodiment, the inputs include a user reading speed 894 and a number of pages remaining 895. In one embodiment, the outputs include a textual indication of a screen brightness level 896, a status of a WLAN receiver 897, and a status of a WAN receiver 898 that will allow the user to complete reading the number of pages remaining 895 before the battery dies. In other embodiments, GUI 890 may include different or additional inputs and outputs.

Figure 9:
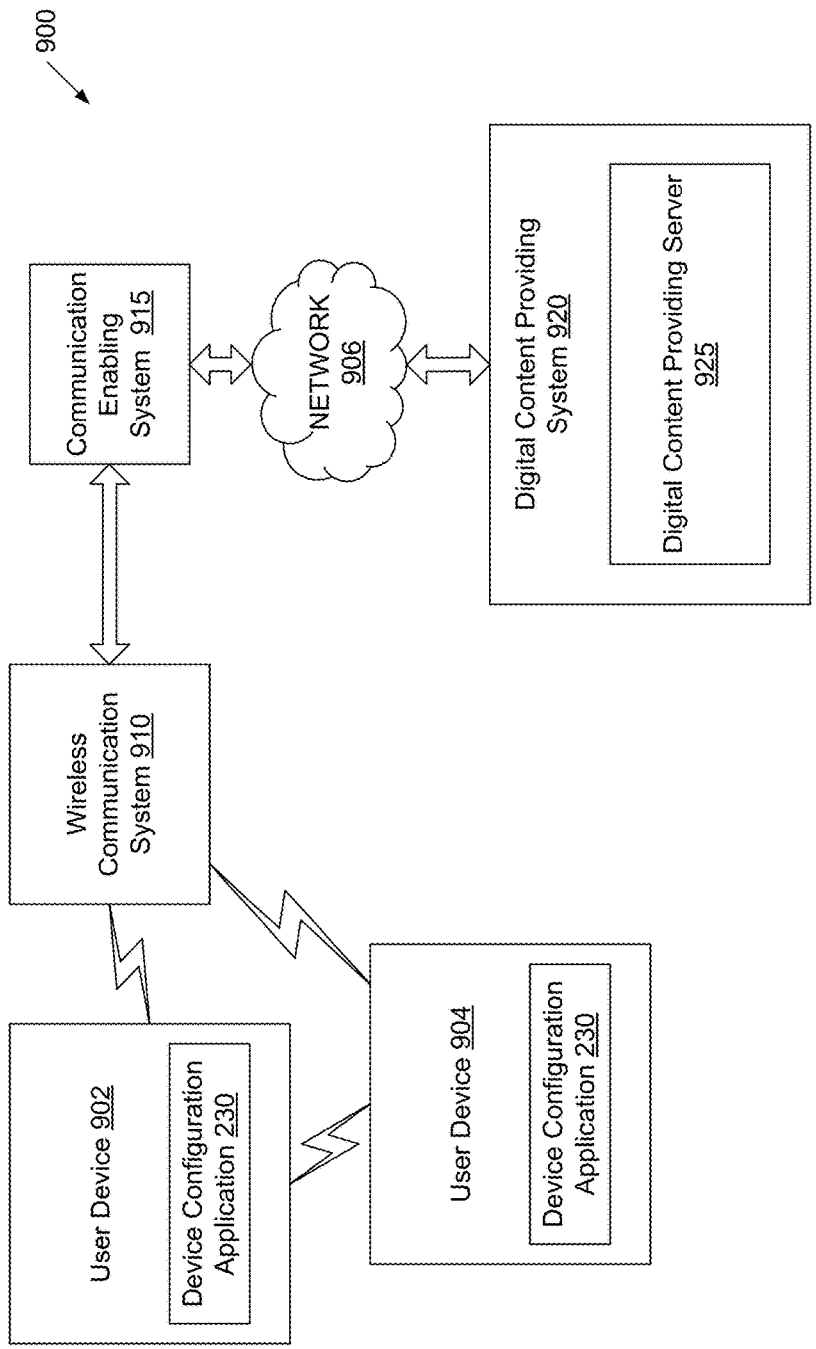
FIG. 9 is a block diagram of a network architecture, in which embodiments of the present invention may operate.

FIG. 9 is a block diagram of a network architecture 900, in which embodiments of the present invention described herein may operate. The network architecture 900 may include a digital content providing system 920 and one or more user devices 902, 904 capable of communicating with the digital content providing system 920 via a network 906. Network 906 may include, for example, a public network such as the Internet or a private network such as a local area network (LAN).

The user devices 902, 904 may be portable computing devices such as electronic book readers or tablet computers (e.g., that include a book reader application). Other examples of portable computing devices include cellular telephones, personal digital assistants (PDAs), portable media players, netbooks, and the like. The user devices 902, 904 may also be non-portable computing devices such as a desktop computer, a set-top box associated with a television, a gaming console, and so on. The user devices 902, 904 are variously configured with different features to enable consumption of one or more types of digital content and electronic publications. The digital content and electronic publications may include electronic books (ebooks) such as electronic textbooks and/or other electronic publications (electronic versions of publications) such as electronic magazines, digital newspapers, digital audio books, electronic journals, real simple syndication (RSS) feeds, etc. The publications may also include digital video (e.g., movies, television, short clips, etc.), images (e.g., art, photographs, etc.), and multi-media content.

The digital content providing system 920 may correspond to any feature or combination of features for providing electronic publications or other digital content to the user devices 902, 904. The digital content providing system 920 may include a network-accessible server-based functionality (digital content providing server 925), various data stores (not shown), and/or other data processing equipment. The digital content providing system 920 may be implemented by a single machine or a cluster of machines. The digital content providing system 920 may include one or more machines (e.g., one or more server computer systems, routers, gateways, etc.) that have processing and storage capabilities to provide the server-based functionality.

In one embodiment, the digital content providing server 925 corresponds to an entity which provides electronic publications (e.g., electronic books) to users upon the users' purchase or download of the items. In this role, the digital content providing server 925 may essentially act as a bookseller or the like. In other cases, the digital content providing server 925 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 925 may deliver, and the user devices 902, 904 receive, electronic publications (or other media items), search results, upgrades, and/or other information via the network 906. For example, the user devices 902, 904 may download or receive ebooks from the digital content providing server 925. The digital content providing server 925 may also receive various requests (e.g., search queries), instructions and other data from the user devices 902, 904 via the network 906.

Communication between the user devices 902, 904 and the item providing system 920 may be enabled via any communication infrastructure. One example of such an infrastructure includes a combination of a wide area network (WAN) and wireless infrastructure, which allows a user to use the user devices 902, 904 to purchase digital content (e.g., electronic publications) and consume the digital content without being tethered to the digital content providing system 920 via hardwired links. The wireless infrastructure may be provided by one or multiple wireless communications systems, such as wireless communication system 910. In one embodiment, wireless communication system 910 may be a wireless fidelity (WLAN) hotspot connected with the network 906. Wireless communication system 910 may also be a wireless carrier system that can be implemented using various data processing equipment, communication towers, etc. Alternatively, or in addition, the wireless carrier system may rely on satellite technology to exchange information with the user devices 902, 904.

The communication infrastructure may also include a communication-enabling system 915 that serves as an intermediary in passing information between the digital content providing system 920 and the wireless communication system 910. The communication-enabling system 915 may communicate with the wireless communication system 910 (e.g., a wireless carrier) via a dedicated channel, and may communicate with the digital content providing system 920 via a non-dedicated communication mechanism, (e.g., a public Wide Area Network (WAN) such as the Internet).

In addition to wirelessly connecting to wireless communication system 910, user devices 902, 904 may also wirelessly connect to other user devices 902, 904. For example, user device 902 may form a wireless ad hoc (peer-to-peer) network with user device 904 using WiFi™, Bluetooth, or other wireless communication protocols.

In one embodiment, each of user devices 902, 904 include device configuration application 230. As described above, device configuration application 230 may be configured to perform goal oriented device configuration. Additional details of device configuration application 230 are provided above.

Figure 10:
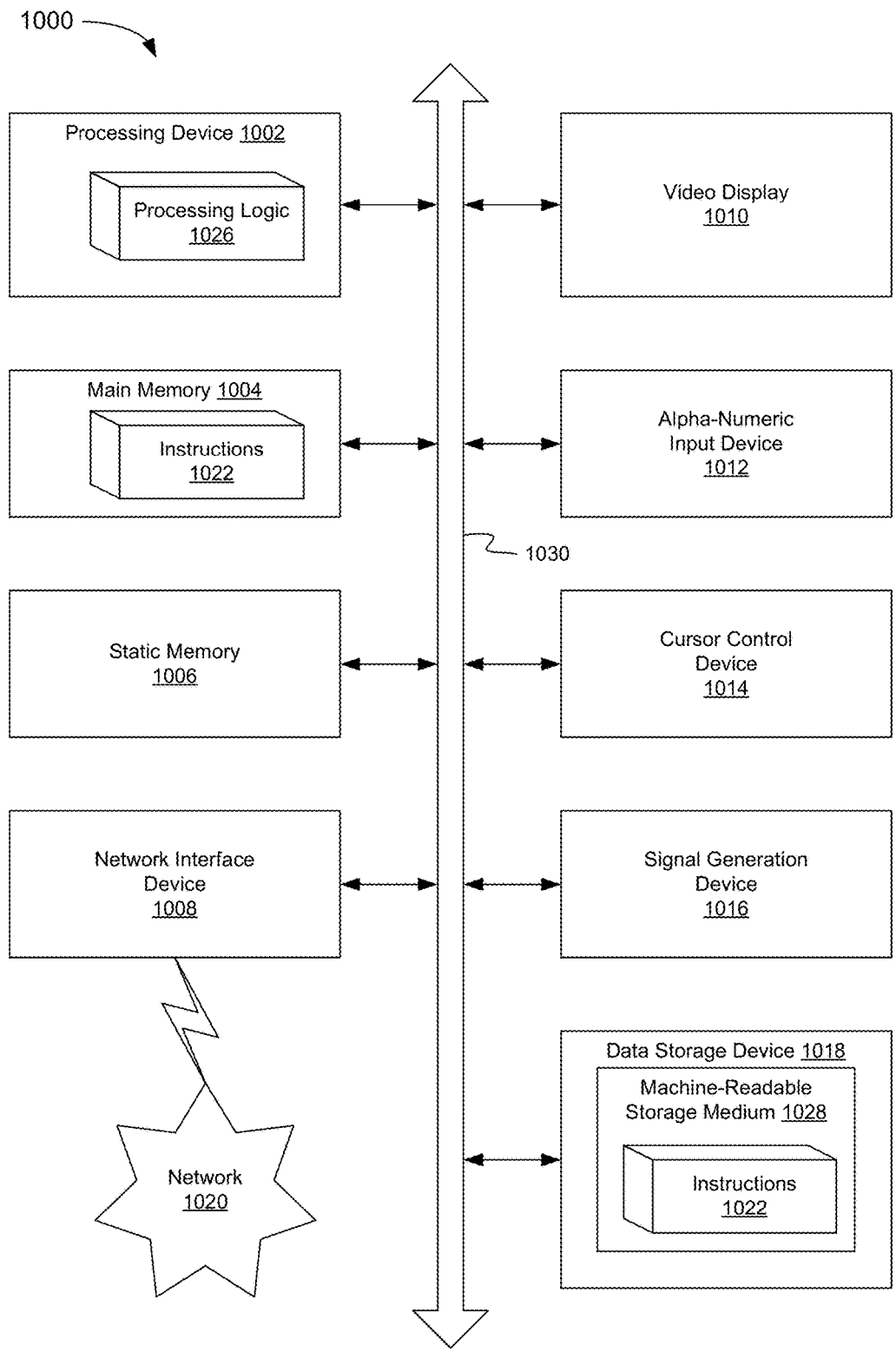
FIG. 10 is a block diagram illustrating a computer system, according to an embodiment.

FIG. 10 illustrates a diagrammatic representation of a machine in the form of a computer system 1000 within which a set of instructions, for causing the machine to perform any one or more of the methodologies discussed herein, may be executed. The system 1000 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1000 may represent digital content providing server 920 of FIG. 9 and/or user device 200 of FIG. 2.

The computer system 1000 includes a processing device (processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)), and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute the notification manager 210 for performing the operations and steps discussed herein.

The computer system 1000 may further include a network interface device 1008. The computer system 1000 also may include a video display unit 1010 (e.g., a bistable display, such as an electrophoretic displays (EPD) or an electrowetting display, a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The data storage device 1018 may include a computer-readable medium 1028 on which is stored one or more sets of instructions 1022 (e.g., instructions of device configuration application 230) embodying any one or more of the methodologies or functions described herein. The instructions 1022 may also reside, completely or at least partially, within the main memory 1004 and/or within processing logic 1026 of the processing device 1002 during execution thereof by the computer system 1000, the main memory 1004 and the processing device 1002 also constituting computer-readable media. The instructions may further be transmitted or received over a network 1020 via the network interface device 1008.

While the computer-readable storage medium 1028 is shown in an embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Figure 11:
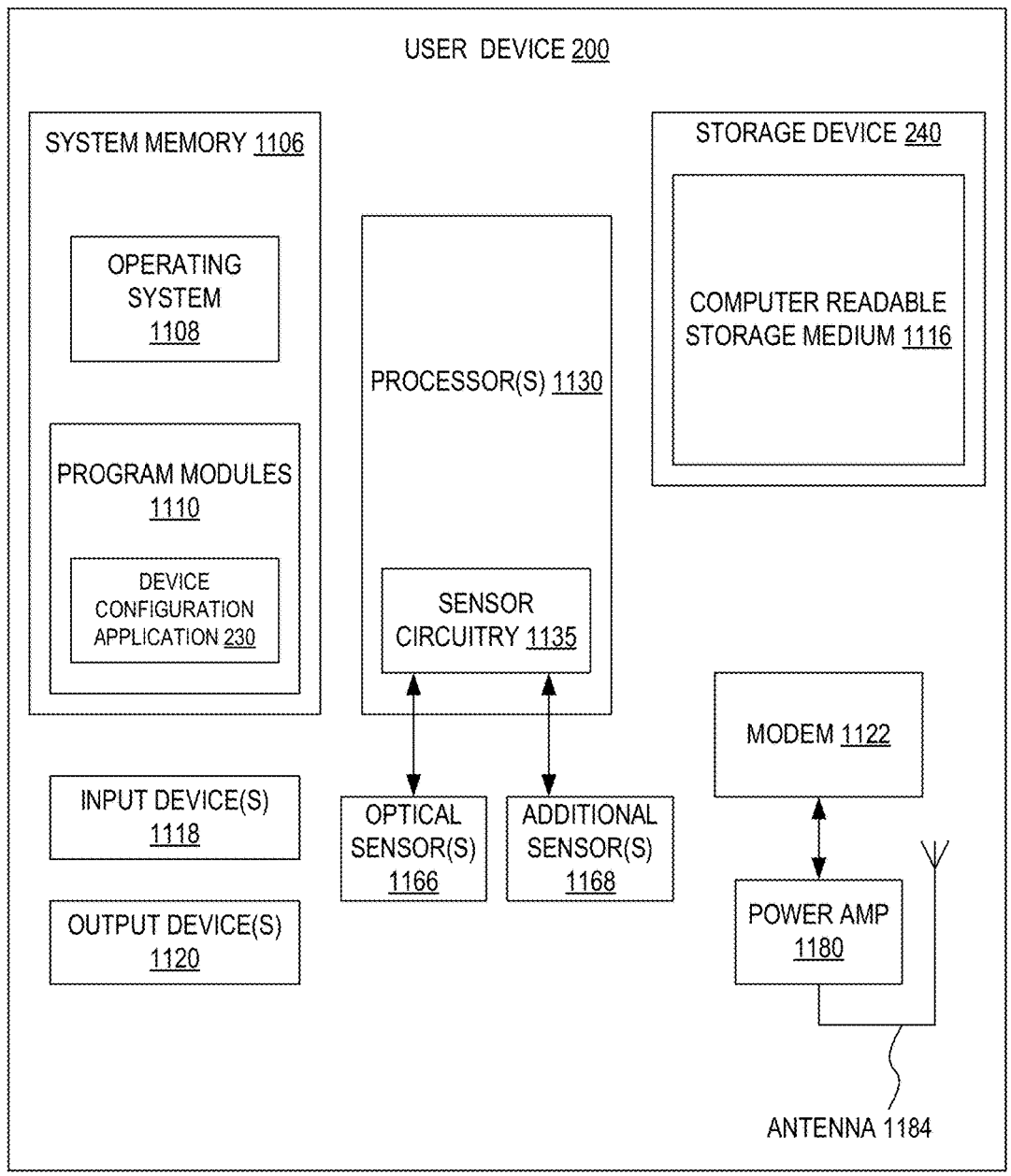
FIG. 11 is a block diagram illustrating a user device, according to an embodiment.

FIG. 11 is a block diagram illustrating an user device 200, according to an embodiment of the present invention. In one embodiment, the user device 200 may correspond to one or all of the user devices 200 of FIG. 2 or 802, 804 of FIG. 8 and may be any type of user device such as an electronic book reader, a PDA, a mobile phone, a laptop computer, a portable media player, a tablet computer, an electronic pad, a desktop computer, a camera, a video camera, a netbook, and the like.

The user device 200 includes one or more processors 1130, such as one or more CPUs, microcontrollers, field programmable gate arrays, or other types of processors. The user device 200 also includes system memory 1106, which may correspond to any combination of volatile and/or non-volatile storage mechanisms. The system memory 1106 stores information which provides an operating system component 1108, various program modules 1110 corresponding to applications 210 and device configuration application 230, and/or other components. The user device 200 performs functions by using the processor(s) 1130 to execute instructions provided by the system memory 1106.

The user device 200 also includes a data storage device 240 that may be composed of one or more types of removable storage and/or one or more types of non-removable storage. The data storage device 240 includes a computer-readable storage medium 1116 on which is stored one or more sets of instructions embodying any one or more of the methodologies or functions described herein. As shown, the instructions may reside, completely or at least partially, within the computer readable storage medium 1116, system memory 1106 and/or within the processor(s) 1130 during execution thereof by the user device 114, the system memory 1106 and the processor(s) 1130 also constituting computer-readable media. The user device 200 may also include one or more input devices 1118 (keyboard, mouse device, specialized selection keys, etc.) and one or more output devices 1120 (displays, printers, audio output mechanisms, etc.).

The user device 200 further includes a wireless modem 1122 to allow the user device 200 to communicate via a wireless network (e.g., such as provided by the wireless communication system) and/or with other computing devices, such as remote computers, the item providing system, online book stores, electronic catalogs for libraries, and so forth. The wireless modem 1122 may allow the user device 200 to handle both voice and non-voice communications (such as communications for text messages, multimedia messages, media downloads, web browsing, etc.) with the wireless communication system 910. The wireless modem 1122 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi™, etc. The wireless modem 1122 may generate signals and send these signals to power amplifier (amp) 1180 for amplification, after which they are wirelessly transmitted via antenna 1184. In addition to sending data, antenna 1184 also receives data, which is sent to wireless modem 1122 and transferred to processor(s) 1130.

In one embodiment, user device 200 includes an optical sensor 1166. The optical sensor 1166 may be a low resolution camera (e.g., having 0.2 or 0.3 Megapixels) that takes images (e.g., of a user's eyes) on a periodic basis. Alternatively, the optical sensor 1166 may have a higher resolution, such as 1 Megapixel up to 10 or more Megapixels. The optical sensor 1166 may be positioned such that images are taken of a user's face while the user holds the user device 200 in front of his face in a standard reading position. Therefore, the optical sensor 1166 may be used to track user eye movement during reading.

In one embodiment, user device 200 includes one or more additional sensors 1168 such as a physical contact sensor, close proximity sensors, or motion sensors. The sensors 1168 can detect the presence of human body parts, and convey information regarding the detected presence to processor(s) 1130. In one embodiment, the sensors 1168 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 1168 may also be optical (e.g., infrared) sensors that use an emitter and receiver pair to detect the presence of opaque objects. Alternatively, the sensors 1168 may be inductive sensors, which include an inductive loop. When the presence of a human body part (or metal object) is brought close to the inductive sensor, an induction of the inductive loop changes, causing the human body part to be detected. Alternatively, the sensors 1168 may be ultrasonic sensors that emit an ultrasonic signal and measure a time duration between when a signal is transmitted and the reflection of that signal received (a.k.a., flight response). The sensors 1168 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 1168 include a motion sensor, such as an accelerometer or one or more gyroscopes. The user device 200 may use motion data from motion sensors to determine whether a user is holding the user device 200. For example, if the user device 200 experiences constant minor accelerations, it may be determined that the user device 200 is being held in a user's hand. Additionally, if the user device 200 is at a particular angle (detectable based on acceleration readings from an accelerometer), it may be determined that the user device 200 is being rested on a user's leg during reading.

The processor(s) 1130 may include sensor circuitry 1135 (e.g., sensor device drivers) that enables the processor(s) 1130 to interpret signals received from the optical sensor(s) 1166 and/or additional sensors 1168. In one embodiment, the optical sensors 1166 and/or additional sensors 1168 output raw sensor data. In another embodiment, the optical sensors 1166 and/or additional sensors 1168 output fully processed signals to the processor(s) 1130. For example, the additional sensors 1168 may output a user contact/no user contact signal using a single line interface or a multi-line interface. In another embodiment, the additional sensors 1168 output, for example, positional data and/or object presence data (e.g., of a human body part) to the processors 1130 without first processing the data. In either instance, the processors 1130 may use the sensor circuitry 1135 to process and/or interpret the received data. If data is received from multiple sensors, processing the data may include averaging the data, identifying a maximum from the data, or otherwise combining the data from the multiple sensors.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

determining, by at least one processing device, that a battery power level of a user device is below a first threshold level;

determining, by the at least one processing device, current device configuration settings associated with the user device, the current device configuration settings comprising font size, margin size and font type;

determining a first number of words presented using a screen, wherein determining the first number depends on a size of the screen and the current device configuration settings;

determining a remaining number of words in a chapter of an electronic book being presented using the screen, the remaining number of words representing how many words in the chapter are yet to be rendered for display;

determining a required number of screen renderings to display the remaining number of words using the current device configuration settings;

determining an amount of battery power required to perform the required number of screen renderings;

determining a remaining amount of battery power of the user device;

determining that the remaining amount of battery power is less than the amount of battery power required to perform the required number of screen renderings; and determining one or more new device configuration settings to decrease a rate at which the battery power level of the device is drained to allow the device to present the chapter the electronic book prior to the battery power level being depleted below a second threshold that is associated with a minimum amount of power the user device requires to present the electronic book for reading.

2. The method of claim 1, wherein determining the one or more new device configuration settings comprises configuring the one or more device configuration settings according to weighted user preferences associated with a user profile associated with the user, wherein the configuring comprises at least one of decreasing the font size, decreasing the margin size or decreasing a display brightness level.

3. The method of claim 1, further comprising:
receiving user input comprising adjustments to the one or more of the device configuration settings, wherein the adjustments comprise at least one of decreasing the font size, decreasing the margin size or decreasing a display brightness level.

4. The method of claim 1, further comprising:
presenting a user interface displaying one or more selectable options for defining a remaining portion of the electronic book, the options comprising a remainder of the chapter of the electronic book and a remainder of the entire electronic book.

5. A user device, comprising:
at least one battery;
memory; and
at least one processing device operatively coupled to the memory, the at least one processing device to:
determine a task to be completed prior to an amount of power available from the at least one battery being below a first predetermined threshold amount of power, wherein completion of the task comprises completing consumption of an electronic publication on the user device;
determine one or more user characteristics impacting power consumption associated with the consumption of the electronic publication on the user device;
determine current device configuration settings associated with the user device;
determine an amount of power above the first predetermined threshold that is available from the at least one battery;
determine that, given the one or more user characteristics and current device configuration settings, the amount of power available above the first predetermined threshold is insufficient to complete the task; and
determine one or more new device configuration settings, according to weighted user preferences associated with a user profile, wherein the weighted user preferences indicate a first component of the user device that is ranked as being of lesser priority than a second component of the user device.

6. The user device of claim 5, wherein the at least one processing device is further configured to:
determine an occurrence of a power condition on the user device, the power condition comprising the amount of power being below a second predetermined threshold amount of power, wherein the second threshold is greater than the first threshold.

7. The user device of claim 5, wherein the at least one processing device is further configured to:
compare the amount of power to an expected amount of power associated with completion of the task given the one or more user characteristics; and
determine that the amount of power is less than the expected amount of power associated with completion of the task.

8. The user device of claim 5, wherein the current device configuration settings comprise at least one of a display brightness level, an activation status of a wireless local area network (WLAN) receiver, an activation status of a wide area network (WAN) receiver, or an activation status of a global positioning system (GPS) receiver.

9. The user device of claim 5, wherein the amount of power comprises at least one of a period of time until expiration of the remaining battery life or a number of screen renderings until expiration of the remaining battery life.

10. The user device of claim 5, wherein the at least one processing device is further configured to:
receive user input comprising adjustments to the one or more of the device configuration settings, wherein to determine the one or more new device configuration settings, the processing device is configured to determine the one or more new device configuration settings according to the user input.

11. The user device of claim 5, wherein the task comprises providing navigation directions to a selected location and wherein the one or more user characteristics comprises a period of time associated with travel to the selected location.

12. A method comprising:
identifying, by at least one processing device, a task to be completed by a user device, wherein completion of the task comprises completing consumption of an electronic publication on the user device;
determining, by the at least one processing device, an amount of battery power that is available in the user device;
determining one or more user characteristics impacting power consumption associated with the consumption of the electronic publication on the user device;
determining that, given the one or more user characteristics and current device configuration settings associated with the user device, the amount of battery power available is insufficient to complete the task; and
determining one or more new device configuration settings, according to weighted user preferences associated with a user profile, to allow completion of the task with the one or more user characteristics using less than the amount of battery power, wherein the weighted user preferences indicate a first component of the user device that is ranked as being of lesser priority than a second component of the user device.

13. The method of claim 12, further comprising:
determining an occurrence of a power condition on the user device, the power condition comprising the amount of battery power being below a predetermined threshold amount of power.

14. The method of claim 12, further comprising:
determining an occurrence of a time condition on the user device, the time condition indicating sustained use of the user device for a period of time.

15. The method of claim 12, wherein determining the one or more user characteristics comprises receiving user input indicating the one or more user characteristics.

16. The method of claim 12, wherein determining the one or more user characteristics comprises monitoring user interactions with the user device for a period of time and determining the one or more user characteristics from the user interactions.

17. The method of claim 12, wherein the amount of battery power is determined based on current device configuration settings.

18. The method of claim 12, wherein the one or more device configuration settings comprises at least one of a display brightness level, an activation status of a wireless local area network (WLAN) receiver, an activation status of a wide area network (WAN) receiver, or an activation status of a global positioning system (GPS) receiver.

19. The method of claim 12, further comprising:
determining that the amount of battery power is less than an amount of power associated with completion of the task; and determining, by the processing device, the one or more new device configuration settings in response to determining that the amount of battery power is less than an amount of power associated with completion of the task.

* * * * *